(12) United States Patent
Zhou et al.

(10) Patent No.: US 11,507,426 B2
(45) Date of Patent: Nov. 22, 2022

(54) RESOURCE POOL MANAGEMENT METHOD AND APPARATUS, RESOURCE POOL CONTROL UNIT, AND COMMUNICATIONS DEVICE

(71) Applicant: Huawei Technologies Co., Ltd., Shenzhen (CN)

(72) Inventors: Chang Zhou, Shanghai (CN); Huanfeng Yin, Shanghai (CN); Xinfa Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 17/096,573

(22) Filed: Nov. 12, 2020

(65) Prior Publication Data

US 2021/0064438 A1 Mar. 4, 2021

Related U.S. Application Data

(63) Continuation of application No. PCT/CN2019/088918, filed on May 29, 2019.

(30) Foreign Application Priority Data

Jun. 6, 2018 (CN) .......................... 201810576339.4

(51) Int. Cl.
*G06F 9/50* (2006.01)
*G06F 11/30* (2006.01)

(52) U.S. Cl.
CPC .......... *G06F 9/5027* (2013.01); *G06F 9/5072* (2013.01); *G06F 9/5077* (2013.01); *G06F 11/3006* (2013.01); *G06F 2209/5011* (2013.01)

(58) Field of Classification Search
CPC .... G06F 9/5027; G06F 9/5072; G06F 9/5077; G06F 11/3006; G06F 2209/5011;
(Continued)

(56) References Cited

U.S. PATENT DOCUMENTS 9,883,513 B2 1/2018 Patil et al.
10,262,390 B1 * 4/2019 Sun ...................... G06F 9/5077
(Continued)

FOREIGN PATENT DOCUMENTS

CN 102651729 A 8/2012
CN 105511810 A 4/2016
(Continued)

*Primary Examiner* — Sisley N Kim
(74) *Attorney, Agent, or Firm* — Slater Matsil, LLP

(57) ABSTRACT

This application provides a resource pool management method and apparatus, a resource pool control unit, and a communications device. The method is applied to a resource pool system including a plurality of communications devices, and one resource pool control unit is deployed on each communications device. A first resource pool control unit that is responsible for managing a resource pool at a current moment receives a resource application request of an application program on any communications device, allocates, from the resource pool according to a preset rule, a first resource including one or more logical hardware devices, and sends a resource configuration request to a second resource pool control unit, so that the second resource pool control unit completes configuration of the first resource based on the resource configuration request, to provide a required hardware device resource for the application program.

20 Claims, 14 Drawing Sheets

(58) Field of Classification Search
CPC ............ G06F 11/2023; G06F 11/2035; G06F 11/3442; G06F 9/5061; G06F 15/173
See application file for complete search history.

(56) References Cited

U.S. PATENT DOCUMENTS

| | | |
|---|---|---|
| 2007/0280686 A1 | 12/2007 | Amemiya et al. |
| 2010/0174841 A1 | 7/2010 | Bogin et al. |
| 2015/0312960 A1 | 10/2015 | Kim et al. |
| 2016/0241486 A1* | 8/2016 | Jiao ................ H04L 67/1008 |
| 2017/0139738 A1* | 5/2017 | Kim .................... G06F 9/452 |
| 2021/0064438 A1 | 3/2021 | Zhou et al. |

FOREIGN PATENT DOCUMENTS

| | | |
|---|---|---|
| CN | 105518611 A | 4/2016 |
| CN | 105917688 A | 8/2016 |
| CN | 106105367 A | 11/2016 |
| CN | 108984465 A | 12/2018 |

\* cited by examiner

RESOURCE POOL MANAGEMENT METHOD AND APPARATUS, RESOURCE POOL CONTROL UNIT, AND COMMUNICATIONS DEVICE

CROSS-REFERENCE TO RELATED APPLICATIONS

This application is a continuation of International Application No. PCT/CN2019/088918, filed on May 29, 2019, which claims priority to Chinese Patent Application No. 201810576339.4, filed on Jun. 6, 2018. The disclosures of the aforementioned applications are hereby incorporated by reference in their entireties.

TECHNICAL FIELD

This application relates to the computer field, and in particular, to a resource pool management method and apparatus, a resource pool control unit, and a communications device in a data center.

BACKGROUND

With the continuous development of computer technologies, there are more data centers that consist of devices on a large scale, which require unified operation and maintenance management. A management node is usually deployed on an independent server in a data center. The management node may identify a hardware device, and the management node forms a resource pool by using hardware resources such as a storage device (for example, a disk), a network device (for example, a network interface card or a switch), and a computing device (for example, a central processing unit (CPU)) in the data center, and allocates complete resources of one or more hardware devices to application programs. For example, when an application program 1 needs to use two CPU resources, the management node may specify two CPUs (for example, a CPU 1 and a CPU 2) in the resource pool to provide hardware resources for the application program 1. In this case, the CPU 1 and the CPU 2 are used only by the application program 1. In addition, operations such as resource release and resource pool capacity expansion require participation of the management node. If the management node is faulty, an entire resource pool cannot be used, application services are interrupted, and data may be lost. This affects normal use of the data center. Therefore, how to provide a resource pool management method independent of the management node is an urgent technical problem to be resolved.

SUMMARY

This application provides a resource pool management method and apparatus, a resource pool control unit, and a communications device, to remove a management node from a resource pool and provide a resource pool management method independent of the management node.

According to a first aspect, a resource pool management method is provided. The method is applied to a resource pool management system, the system includes a plurality of communications devices, one resource pool control unit is deployed on each of some or all of the communications devices, and the communications devices communicate with each other through the resource pool control unit. First, the first resource pool control unit receives a resource application request of an application program on any communications device. The resource application request includes a type and a resource quantity of a required resource, and the first resource pool control unit is responsible for managing a resource pool at a current moment and is any one of a plurality of resource pool control units. The type is used to indicate a type of a hardware resource required by the application program, and the resource quantity is used to indicate a size of the hardware resource required by the application program. Then, the first resource pool control unit allocates, from a resource pool according to a preset rule, one or more logical hardware devices that meet the type and the resource quantity requirement as a first resource. A resource of the logical hardware device in the resource pool is provided by an idle hardware device in the plurality of communications devices, and each logical device corresponds to one or more hardware devices. Finally, the first resource pool control unit sends a resource configuration request to a second resource pool control unit deployed on the communications device on which the application program is located, to indicate the second resource pool control unit to complete configuration of the first resource based on the resource configuration request, and provide the required resource for the application program.

In the foregoing technical solution, the resource pool control unit is deployed on all or some communications devices in the system based on a service requirement, and then a resource control unit is selected from a plurality of resource pool control units to manage the resource pool. When the request of the application program is received, the resource pool control unit that is responsible for managing the resource pool at the current moment may be allocated as the first resource that includes one or more logical hardware devices, and the first resource is allocated to the application program for use. A resource pool control unit in deployed resource pool control units is responsible for managing the resource pool at any moment. When the resource pool control unit that manages the resource pool at the current moment is faulty, another resource pool control unit may continue to manage the resource pool, to avoid affecting a system service. On the other hand, a quantity of resource pool control units may be flexibly configured. As long as a resource pool control unit is added to the communications device, the resource pool control unit can participate in resource pool management, and a layout manner is more flexible. During specific implementation, the quantity of resource pool control units may be set based on a service requirement. Compared with a manner in which a management node needs to be deployed through an independent communications device in a conventional technology, this method reduces costs.

In a possible implementation, that the first resource pool control unit is a resource pool control unit determined from the plurality of resource pool control units according to any one of the following rules includes: the first resource pool control unit is any resource pool control unit determined based on an identifier of the resource pool control unit; the first resource pool control unit is a resource pool control unit with a lightest load in the plurality of resource pool control units; and the first resource pool control unit is a first started resource pool control unit in the system.

It can be learned from the foregoing description that any resource pool control unit in the plurality of communications devices on which the resource pool control unit is deployed may be selected to manage the resource pool, to eliminate a centralization problem caused by relying on a management node in resource pool management in a conventional technology. In addition, a quantity of deployed resource pool control units may be set based on a service requirement, and configuration is more flexible.

In another possible implementation, in a system initialization phase, the first resource pool control unit further needs to be responsible for collecting first hardware information that is on the communications device on which the first resource pool control unit is located and that can be used to establish the resource pool, and receive second hardware information that is sent by a resource pool control unit deployed on each communications device of the communications devices other than the communications device on which the first resource pool control unit is located in the plurality of communications devices and that can be used to establish the resource pool. The first hardware information and the second hardware information each include a type, a resource quantity, and a position of a hardware device that is on a communications device on which the first hardware information and the second hardware information is located and that can be used to establish a resource pool. Then, the first resource pool control unit creates the resource pool based on the first hardware information and the second hardware information, and creates one or more logical hardware devices in each resource pool. A resource of each logical hardware device is provided by one or more hardware devices.

It can be learned from the foregoing description that, in a process of managing the resource pool, especially in an initialization phase, the first resource pool control unit needs to create the resource pool by using a resource provided by a hardware device that is on the communications devices and that can be used to form the resource pool, and allocate the resource provided by the hardware device as one or more logical hardware devices, to refine a resource management granularity, and improve resource usage.

In another possible implementation, the first resource pool control unit is specifically configured to create one or more resource pools based on the type of the hardware device, and group one or more hardware devices into a plurality of groups in a same resource pool based on the resource quantity provided by the hardware devices.

In another possible implementation, a method for creating a logical device by the first resource pool control unit includes one or more of the following:

Method 1: A plurality of hardware devices are logically allocated as one logical hardware device.

Method 2: One hardware device is logically allocated as a plurality of logical hardware devices.

Method 3: One hardware device is logically allocated as one logical hardware device.

In this way, the hardware device is refinedly managed, and different logical devices are allocated to different applications based on different service requirements, to meet different resource requirements and improve usage of the hardware device in the resource pool.

In another possible implementation, when allocating the first resource, the first resource pool control unit preferentially allocates a logical hardware device that includes a resource of a hardware device of a communications device closest to the communications device on which the second resource pool control unit is located, as the first resource. The communications device closest to the communications device on which the second resource pool control unit is located is a communications device that has a shortest data transmission distance from the second resource pool control unit. This reduces a delay for the application program to access a hardware resource, shortens a data processing duration, and improves data processing efficiency.

In another possible implementation, in addition to the foregoing manner of allocating the first resource, the first resource pool control unit may further pre-establish a binding relationship between the second resource pool control unit and another resource pool control unit in a same resource pool. When an application program of a communications device on which a resource pool control unit having the binding relationship is located needs to apply for a resource, the first resource pool control unit preferentially allocates a logical hardware device that includes a resource of a hardware device of a communications device on which a resource pool control unit having the binding relationship with the second resource pool control unit is located, as the first resource.

In a specific embodiment, to meet a service requirement of a special or important application program, the binding relationship of the resource pool control unit may be pre-established based on hardware configuration or a position and a processing capability of the logical hardware device, to ensure the requirement of the special or important application for the hardware device, and improve the processing capability of the hardware device.

According to a second aspect, this application provides a resource pool management apparatus. The apparatus includes modules configured to perform the resource pool management method in any one of the first aspect or the possible implementations of the first aspect.

According to a third aspect, this application provides a resource pool control unit. The resource pool control unit includes a processor and a memory, the memory is configured to store a computer-executable instruction, and when the resource pool control unit runs, the processor executes the computer-executable instruction in the memory, to perform the operation steps of the resource pool management method in any one of the first aspect or the possible implementations of the first aspect by using a hardware resource in the resource pool control unit.

According to a fourth aspect, this application provides a communications device, including a resource pool control unit, a hardware device that can form a resource pool, and a bus according to any one of the third aspect or the possible implementations of the third aspect. The resource pool control unit and the hardware device that can form the resource pool are connected and communicate with each other through the bus, the resource pool control unit includes a processor and a memory, the memory is configured to store a computer-executable instruction, and when the communications device runs, the processor executes the computer-executable instruction in the memory, to perform the operation steps of the resource pool management method in any one of the first aspect or the possible implementations of the first aspect by using a hardware resource on the communications device.

According to a fifth aspect, this application provides a computer-readable storage medium. The computer-readable storage medium stores an instruction, and when the instruction is run on a computer, the computer is enabled to perform the method in the foregoing aspects.

According to a sixth aspect, this application provides a computer program product including an instruction. When the computer program product runs on a computer, the computer is enabled to perform the method in the foregoing aspects.

This application further provides a message transmission method and a device, to save a computing resource of a processor of a communications device on which a hardware device is located, and reduce a delay in accessing a hardware device in another communications device by the communications device when the communications device accesses the hardware device in the another communications device.

According to a seventh aspect, this application provides a message transmission method. The method is applicable to a communications system including a plurality of communications devices, and each communications device includes a processor, an access component, and at least one hardware device. A first communications device in this method is any communications device in the communications system. A virtual hardware device of the first communications device includes at least one hardware device. The method includes the following steps.

After obtaining a message transmitted by a processor of the first communications device, a first access component of the first communications device determines a transmission object of the message, when the first access component determines that the transmission object is a target hardware device on a second communications device, converts a storage address, of a memory of the processor, included in the message into a storage address indicating the target hardware device, and converts a storage address of the virtual hardware device included in the message into the storage address of the target hardware device. Then, the first access component sends the message to a second access component of the second communications device.

According to the method, after receiving the message, the second access component may directly transmit the message to the target hardware device based on the storage address indicating the target hardware device without performing an operation through the processor of the second communications device. Therefore, the target hardware device may read or write target data based on the storage address of the target hardware device and an indicated storage address of the hardware device. It is clearly that the method may save a computing resource of the processor of the second communications device, and may also reduce a delay in accessing a hardware device located on another communications device by the first communications device.

In a possible implementation, the first access component and the second access component communicate with each other through a network. In this case, the first access component may send a message to the second access component in a form of a network packet. In other words, the first access component encapsulates the message into a first packet and sends the first packet to the second access component. In this manner, the first access component may successfully send the message to the second access component through the network.

In another possible implementation, representation forms of the first access component and the second access component are the same, and may be any one or a combination of a plurality of representation forms of an FPGA, a CPLD, an ASIC, and an SOC. In this way, flexibility of a representation form of an access component of the communications device may be improved in this manner.

In still another possible implementation, the first access component may determine, in the following manner, that the transmission object of the message is the target hardware device.

The first access component obtains stored resource configuration information, and the resource configuration information includes a storage address range corresponding to each hardware device forming the virtual hardware device. The first access component determines a storage address range in which a storage address of the virtual hardware device included in the message is located, and then determines, in the resource configuration information, that a hardware device corresponding to the storage address range is the target hardware device.

In this way, the first access component may accurately determine the transmission object of the message.

In still another possible implementation, the first access component may generate a first mapping table that records a storage address of the memory of the processor and that indicates the storage address of the target hardware device, and then converts the storage address, of the memory of the processor, included in the message by using the first mapping table, into the storage address indicating the target hardware device.

In this manner, conversion efficiency of the storage address of the memory of the first access component processor may be improved. In addition, after subsequently receiving the message including the storage address of the target hardware device, the first access component may continue to convert, by using the first mapping table, the storage address indicating the target hardware device into the storage address of the memory of the processor. Therefore, efficiency of the first access component in converting the storage address indicating the target hardware device may also be improved.

In still another possible implementation, the first access component may generate the first mapping table in the following steps.

The first access component determines indication information of the target hardware device. For example, when the resource configuration information includes description information and the corresponding storage address range that are of each hardware device, the first access component may determine description information of the target hardware device when determining the transmission object of the message, and then the first access component determines the indication information of the target hardware device based on the description information of the target hardware device.

Then, the first access component adds the indication information of the target hardware device to the storage address of the memory of the processor, to obtain the storage address indicating the target hardware device, and finally generates the first mapping table.

In this manner, the first access component may accurately obtain the storage address indicating the target hardware device, and generate the first mapping table.

In still another possible implementation, the indication information of the target hardware device includes an identifier of the target hardware device and/or an identifier of a board connected to the target hardware device on the second communications device. According to this design, when receiving the message, the second access component may accurately determine the transmission object of the message based on the indication information of the target hardware device.

In still another possible implementation, when there is an idle bit field in an address field in which the storage address of the memory of the processor is located in the message, the indication information of the target hardware device may occupy all or some idle bit fields. This manner may avoid increasing message transmission overheads, and improve bit resource utilization of the address field.

In still another possible implementation, when a function of the processor of the first communications device is virtualized into a plurality of functions, the first access component may add, to the storage address of the memory of the processor when generating the storage address indicating the target hardware device, an identifier of a function used when the processor transmits the message. In this manner, the first access component may further add the identifier of the function used by the processor to the message.

In still another possible implementation, when the virtual hardware device includes only one target hardware device, if the target hardware device provides all hardware resources for the first communications device, the storage address of the target hardware device is the same as the storage address of the virtual hardware device. If the target hardware device provides some hardware resources for the first communications device, storage address of the target hardware device=storage address of the virtual hardware device+ offset position corresponding to the target hardware device. The offset position corresponding to the target hardware device is a start storage position of a hardware resource provided by the target hardware device for the first communications device, and the offset position corresponding to the target hardware device may be obtained from the resource configuration information.

In this manner, the first access component may accurately determine the storage address of the target hardware device based on an actual configuration status of a hardware resource in the virtual hardware device.

In still another possible implementation, when the virtual hardware device includes a plurality of hardware devices, the first access component may convert the storage address of the virtual hardware device into the storage address of the target hardware device based on a second mapping table, and the second mapping table is used to describe a mapping relationship between the storage address of the virtual hardware device and the storage address of the target hardware device.

The second mapping table is generated based on a size of a hardware resource that is provided by each hardware device for the first communications device and that is specified in the resource configuration information, and a sequence of providing the hardware resource by each hardware device for the first communications device.

When the target hardware device provides all hardware resources for the first communications device, the second mapping table may indicate the following mapping relationship: storage address of the target hardware device=storage address of the virtual hardware device−sum of sizes of hardware resources provided by a hardware device that provides the hardware resources for the first communications device before the target hardware device.

When the target hardware device provides some hardware resources for the first communications device, the second mapping table may indicate the following mapping relationship: storage address of the target hardware device=storage address of the virtual hardware device−sum of sizes of hardware resources provided by the hardware device that provides the hardware resource for the first communications device before the target hardware device+offset position corresponding to the target hardware device.

In this manner, the first access component may accurately determine the storage address of the target hardware device based on an actual configuration status of the hardware resource in the virtual hardware device.

In still another implementation, the message is a write request message. In this case, after the first access component sends the message to the second access component, the method further includes the following steps.

The first access component receives a second packet sent by the second access component, converts a storage address that is in the second packet and that indicates the target hardware device into the storage address of the memory of the processor based on the first mapping table, reads the target data in the storage position indicated by the storage address of the memory of the processor, and sends a third packet to the second access component, and the third packet includes the target data, the storage address indicating the target hardware device, and the storage address of the target hardware device.

In this manner, the first access component may send to-be-written target data to the second access component, to write the to-be-written target data into the target hardware device, and implement a write operation.

In still another implementation, the message is a read request message. In this case, after the first access component sends the message to the second access component, the method further includes the following steps.

The first access component receives a fourth packet sent by the second access component, converts the storage address that is in the third packet and that indicates the target hardware device into the storage address of the memory of the processor based on the first mapping table, and stores target data carried in the fourth packet in the storage position indicated by the storage address of the memory of the processor.

In this manner, the first access component may write the target data read from the target hardware device into the memory of the processor, to implement a read operation.

According to an eighth aspect, this application provides a message transmission method. The method is applicable to a communications system including a plurality of communications devices, and each communications device includes a processor, an access component, and at least one hardware device. A second communications device in this method is any communications device in the communications system. The method includes the following steps.

After receiving a message sent by a first access component of a first communications device, a second access component of the second communications device determines a target hardware device based on a storage address, of the target hardware device, indicated in the message. Then, the second access component transmits, to the target hardware device, a first message that includes a storage address indicating the target hardware device and the storage address of the target hardware device, and the target hardware device may read or write target data based on two storage addresses in the first message.

According to the method, after receiving the message, the second access component may directly transmit the message to the target hardware device based on the storage address indicating the target hardware device without performing an operation through the processor of the second communications device. Therefore, the target hardware device may read or write target data based on the storage address of the target hardware device and an indicated storage address of the hardware device. It is clearly that the method may save a computing resource of the processor of the second communications device, and may also reduce a delay in accessing a hardware device located on another communications device by the first communications device.

In a possible implementation, the second access component and the first access component communicate with each other through a network. In this case, the first access component may send a message to the second access component in a form of a network packet. In other words, the first access component encapsulates the message into a first packet and sends the first packet to the second access component, and the second access component obtains the message in the first packet by decapsulating the message. In this manner, the first access component may successfully send the message to the second access component through the network.

In another possible implementation, representation forms of the first access component and the second access component are the same, and may be any one or a combination of a plurality of representation forms of an FPGA, a CPLD, an ASIC, and an SOC. In this way, flexibility of a representation form of an access component of the communications device may be improved in this manner.

In still another possible implementation, the first message is a write request message. After the second access component sends the first message to the target hardware device, the method further includes the following steps.

The second access component receives a second message sent by the target hardware device, encapsulates the second message into a second packet, and sends the second packet to the first access component. The second message is used to request to read target data stored in a memory of the processor of the first communications device, and includes the storage address indicating the target hardware device and the storage address of the target hardware device. Then, the second access component receives a third packet sent by the first access component, and the third packet includes the target data, the storage address indicating the target hardware device, and the storage address of the target hardware device.

The second access component determines the target hardware device based on the storage address that is in the third packet and that indicates the target hardware device, and stores the target data at a storage position indicated by the storage address of the target hardware device.

In this manner, the second access component may store to-be-written target data into the target hardware device, to implement a write operation.

In still another possible implementation, the first message is a read request message. After the second access component sends the first message to the target hardware device, the method further includes the following steps.

The second access component receives a third message sent by the target hardware device, encapsulates the third message into a fourth packet, and sends the fourth packet to the first access component. The third message is used to request to store the target data in the memory of the processor, the third message includes the target data and the storage address indicating the target hardware device, and the target data is read by the target hardware device from the storage position indicated by the storage address of the target hardware device.

In this way, after receiving the fourth packet, the first access component may convert the storage address indicating the target hardware device into a storage address of the memory of the processor, and further store the target data in the memory of the processor, to implement a read operation.

According to a ninth aspect, this application further provides a first access component. The first access component is applied to a first communications device, the first communications device is any communications device in a communications system, the communications system includes a plurality of communications devices, and each communications device includes a processor, an access component, and a hardware device. The first access component includes modules that perform the message transmission method in any one of the seventh aspect or the possible implementations of the seventh aspect.

According to a tenth aspect, this application further provides a second access component. The second access component is applied to a second communications device, the second communications device is any communications device in a communications system, the communications system includes a plurality of communications devices, and each communications device includes a processor, an access component, and a hardware device. The second access component includes modules configured to perform the message transmission method in any one of the eighth aspect or the possible implementations of the eighth aspect.

According to an eleventh aspect, this application further provides a communications device. The communications device includes a processor, an access component, and a hardware device. The access component is configured to implement the methods provided in the aspects.

According to a twelfth aspect, this application provides a computer-readable storage medium. The computer-readable storage medium stores an instruction, and when the instruction is run on a computer, the computer is enabled to perform the methods in the seventh aspect to the eleventh aspect.

In this application, the implementations provided in the foregoing aspects may be further combined to provide more implementations.

DETAILED DESCRIPTION OF ILLUSTRATIVE EMBODIMENTS

The following clearly describes the technical solutions in the embodiments of this application with reference to the accompanying drawings in the embodiments of this application.

Figure 1:
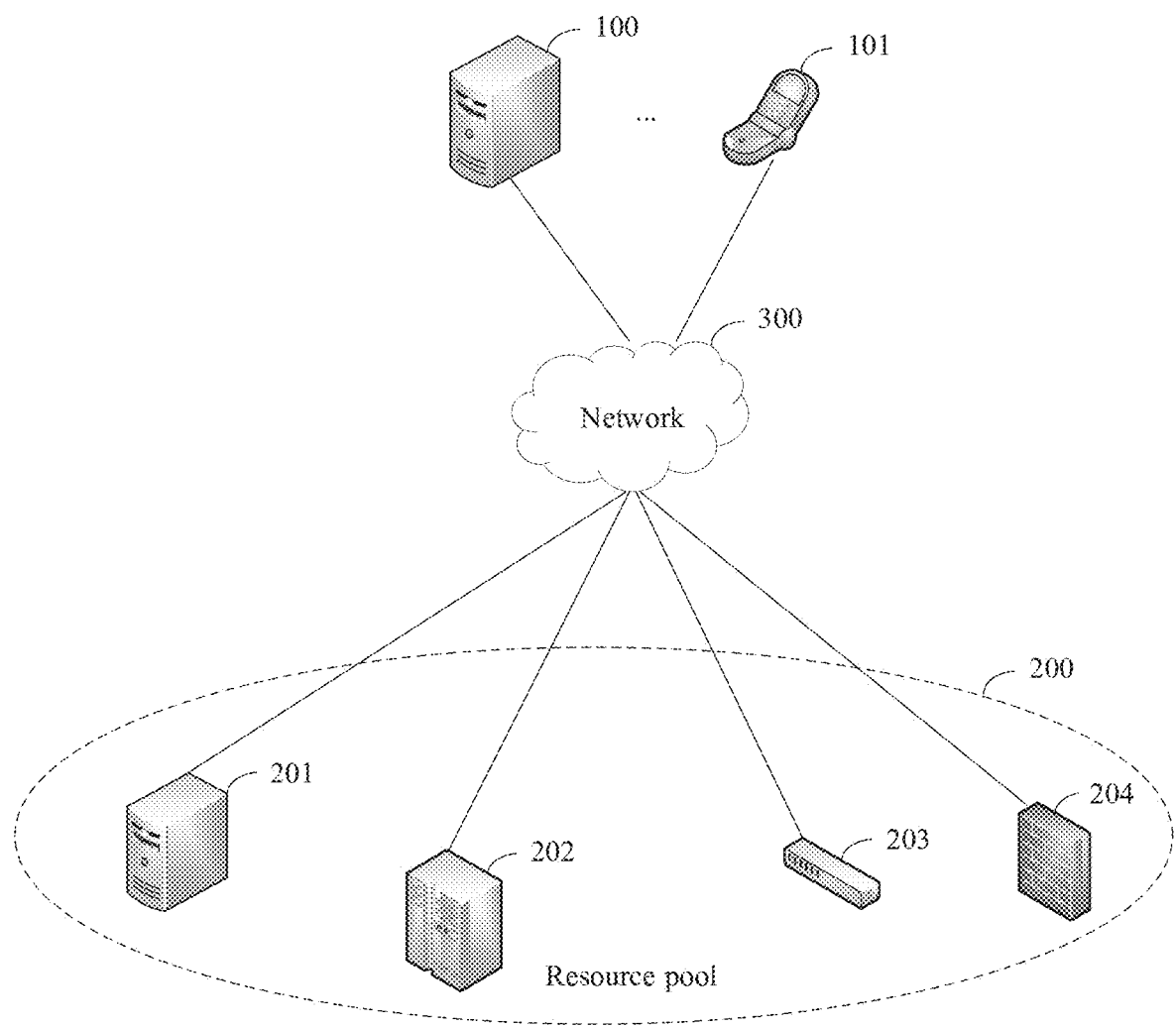
FIG. 1 is a schematic architectural diagram of a resource pool management system according to an embodiment of this application.

FIG. 1 is a schematic diagram of a system architecture of a resource pool according to an embodiment of this application. As shown in the figure, the system includes a plurality of communications devices, and may be specifically divided into an application device and a resource device based on a function of each communications device. For a same communications device, the communications device may be the application device, or the resource device. The application device is configured to run an application program of a user, and may be specifically a server 100 or a terminal 101. The terminal includes a smartphone, a portable computer, a tablet computer, and the like. The resource device includes a server 201, a large computing device 202, a switch 203, and a firewall 204. A plurality of resource devices jointly form one or more resource pools 200. The application device communicates with the resource device in the resource pool through a network 300, and the application device may use a hardware resource in the resource pool 200 through the network 300. The network 300 may use Ethernet and a remote direct memory access (RDMA) network. The RDMA network includes an IB (InfiniBand) network, and the like.

Figure 2A:
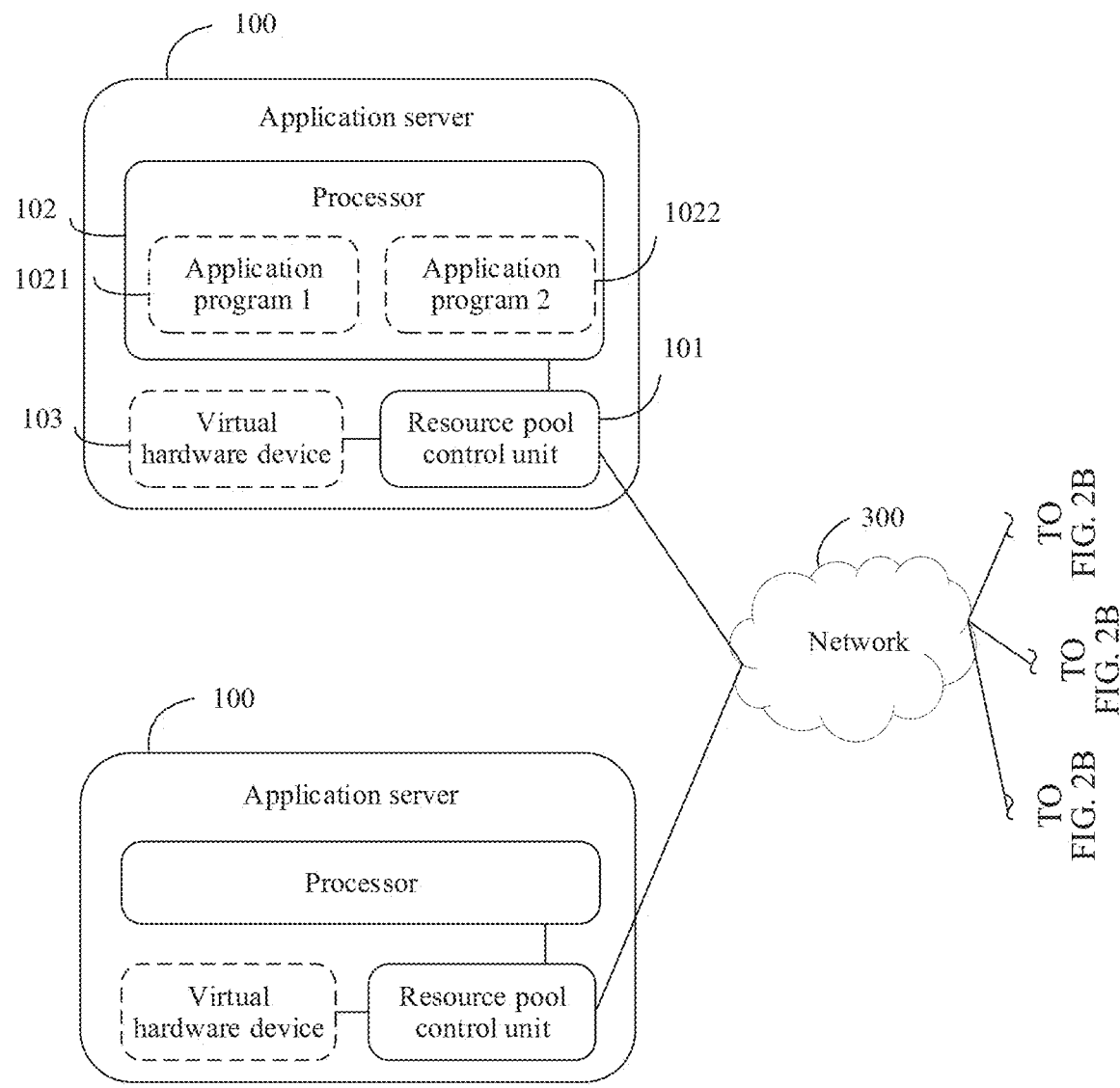
FIG. 2A and FIG. 2B are schematic architectural diagrams of another resource pool management system according to an embodiment of this application.
Figure 2B:
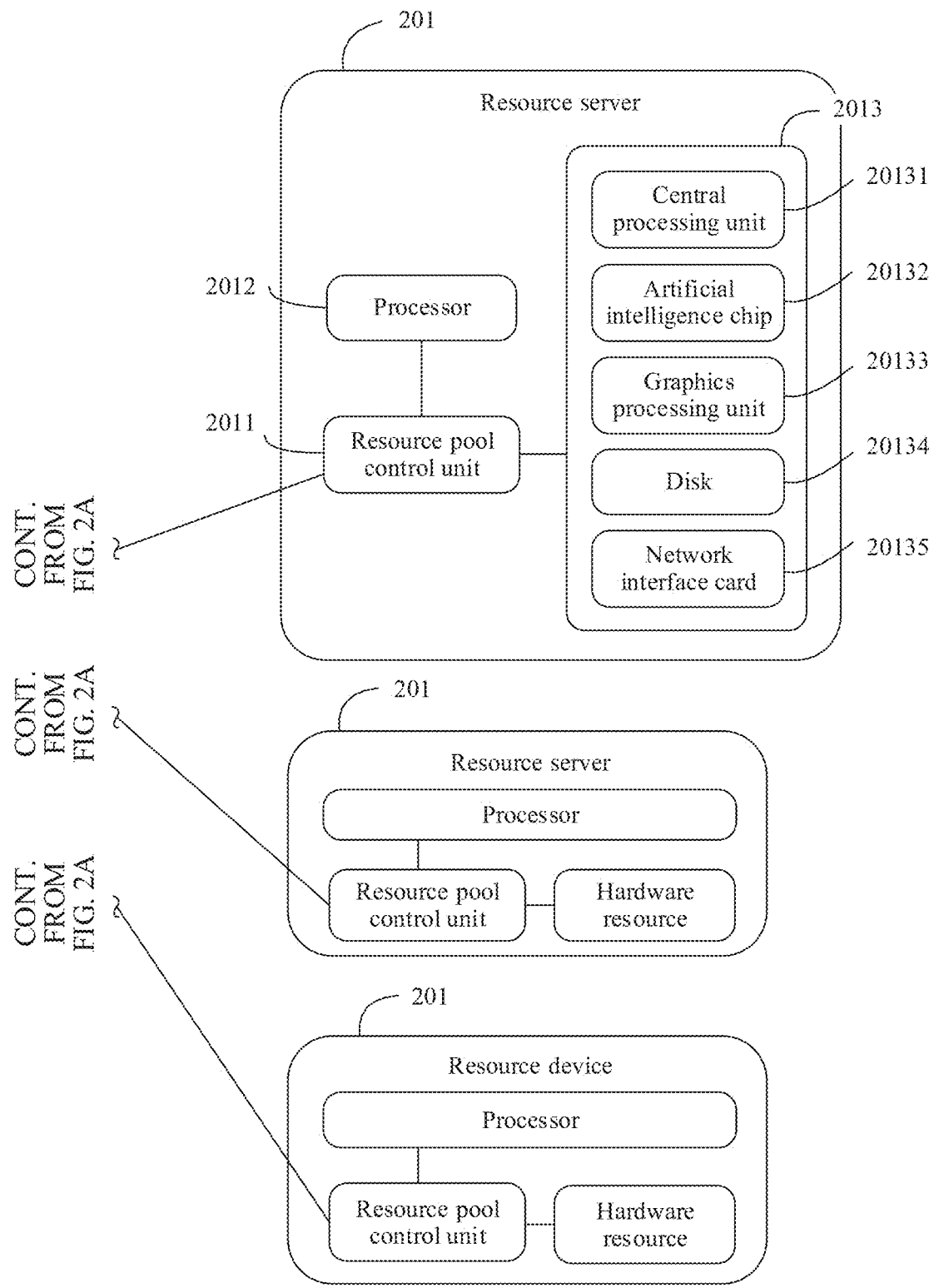

For ease of description, an example in which the application device and the resource device are servers is used for description in this embodiment of this application. FIG. 2A and FIG. 2B are schematic diagrams of another system architecture of a resource pool according to an embodiment of this application. As shown in the figure, the system includes an application server 100 and a resource server 201. The application server 100 includes a resource pool control unit (pool controller unit, PCU) 101, a processor 102, and a virtual hardware device 103. The virtual hardware device 103 comes from a resource pool that includes a plurality of resource servers 201. The resource pool control unit 101 is connected to the processor 102 and the virtual hardware device 103. The resource pool control unit 101 and the processor 102 are connected through peripheral component interconnect express (PCIe) or ultra path interconnect (UPI). The processor 102 of the application server 100 does not sense existence of the resource pool, and the application server accesses various hardware resources on the resource server only through the resource pool control unit 101. A plurality of application programs, for example, an application program 1021 and an application program 1022, run in the processor 102. Each application server 100 accesses the resource server 201 through a network 300. The resource server 201 includes a resource pool control unit 2011, a processor 2012, and a hardware resource 2013. The resource pool control unit 2011 and the processor 2012 are also connected through the PCIe or the UPI. The hardware resource 2013 includes a computing resource, a storage resource, and a network resource. The computing resource is, for example, a central processing unit (PU), an artificial intelligence chip, and a graphic processing unit (GPU). The storage resource includes a disk 20134, and may be specifically a mechanical hard disk, for example, a serial attached small computer system interface (SAS) disk, a serial advanced technology attachment (SATA) disk, or may be a solid state disk (SSD). The network resource may be a network interface card 20135.

The resource pool control unit 101 on the application server 100 and the resource pool control unit 2011 on the resource server 201 shown in FIG. 2B may be implemented through hardware. For example, the resource pool control unit may be implemented through a CPU, a field-programmable gate array (FPGA), and an application-specific integrated circuit (ASIC), a system on chip (SOC), or a programmable logic device (PLD). The PLD may be a complex program logic device (CPLD), or generic array logic (GAL), or any combination thereof.

Optionally, the resource pool control unit 101 on the application server 100 and the resource pool control unit 2011 on the resource server 201 may also be implemented through software, and may be specifically a segment of computer program code stored in a storage medium (not shown in the figure) of the application server, and the processor 102 on the application server 100 executes the segment of program code to implement a function of the resource pool control unit 101.

Optionally, the resource pool control unit 101 on the application server 100 and the resource pool control unit 2011 on the resource server 201 shown in FIG. 2B may also be referred to as access components. In addition to being used to manage a resource pool, the access component is a dedicated hardware component of the communications device, and is configured to implement hardware resource access inside the communications device and between communications devices. Because the access component can implement the hardware resource access between communications devices, the access component has a network communication function. Optionally, the access component may be separately connected to an access component and a hardware device in another communications device through a plurality of peripheral interfaces. Optionally, the peripheral interface may be an extended peripheral component interconnect (PCI) interface, an extended peripheral component interconnect express (PCIe) interface, or another peripheral interface that can be used to communicate with another communications device. This is not limited in this application. The access component may implement transparent transmission of a message between the processor and the hardware device through the peripheral interface. The transparent transmission of the message is that the access component only converts a storage address contained in the message during transmission of the message, but does not change other contents of the message (such as other data contained in the message and the type of the message). In other words, a difference between a message generated by the processor and a message finally received by the hardware device, and a difference between a message generated by the hardware device and a message finally received by the processor only lie in different storage addresses.

In a possible implementation, the hardware resource of the application server in FIG. 2A and FIG. 2B may also be added to the resource pool, to provide a hardware resource for all application server hardware.

In another possible implementation, in addition to the resource pool control unit deployed on each server in FIG. 2A and FIG. 2B, some servers may be selected based on a service requirement to deploy the resource pool control unit, and a server on which the resource pool control unit is deployed may participate in resource pool management. For ease of description, in the following description of this application, an example in which a resource pool control unit is deployed on each server shown in FIG. 2A and FIG. 2B is used for description.

In a conventional technology, an independent server is usually used as a management node, and a management process of the resource pool requires participation of the management node. When the management node is faulty, an application program running on the application server cannot use a hardware resource in the resource pool. This causes service interruption or data loss of a user. To resolve the foregoing problem, an embodiment of this application provides a technical solution of removing the management node. A resource pool includes a plurality of pieces of hardware of a same resource server or a plurality of pieces of hardware of different resource servers. A pooling management unit is deployed on an application server and a resource server, and each resource pool control unit communicates through a network, and provides the hardware resource for the application server. Resource pool control units share resource pool management tasks, to improve reliability of the resource pool system.

Figure 3A:
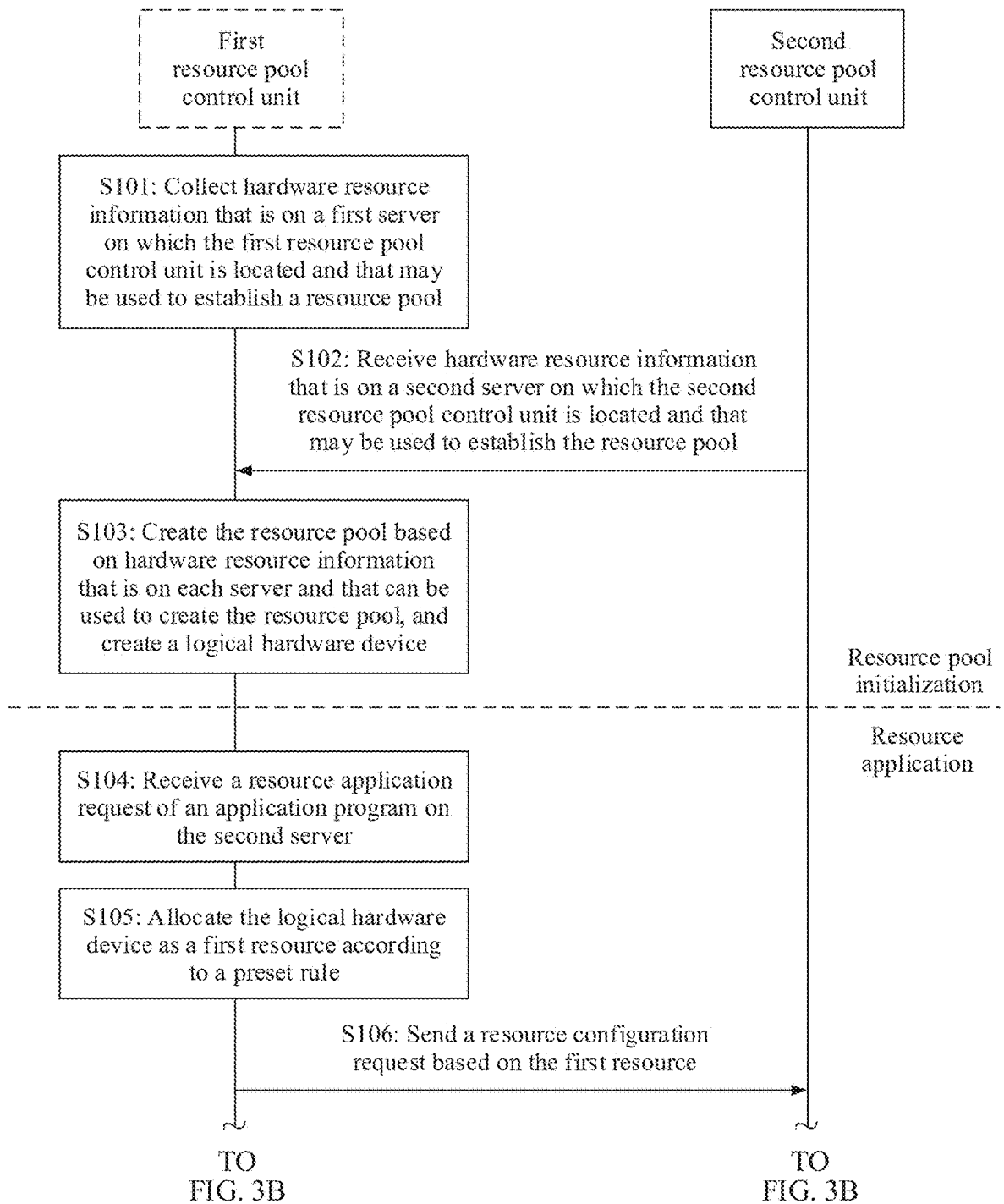
FIG. 3A and FIG. 3B are schematic flowcharts of a resource pool management method according to an embodiment of this application.
Figure 3B:
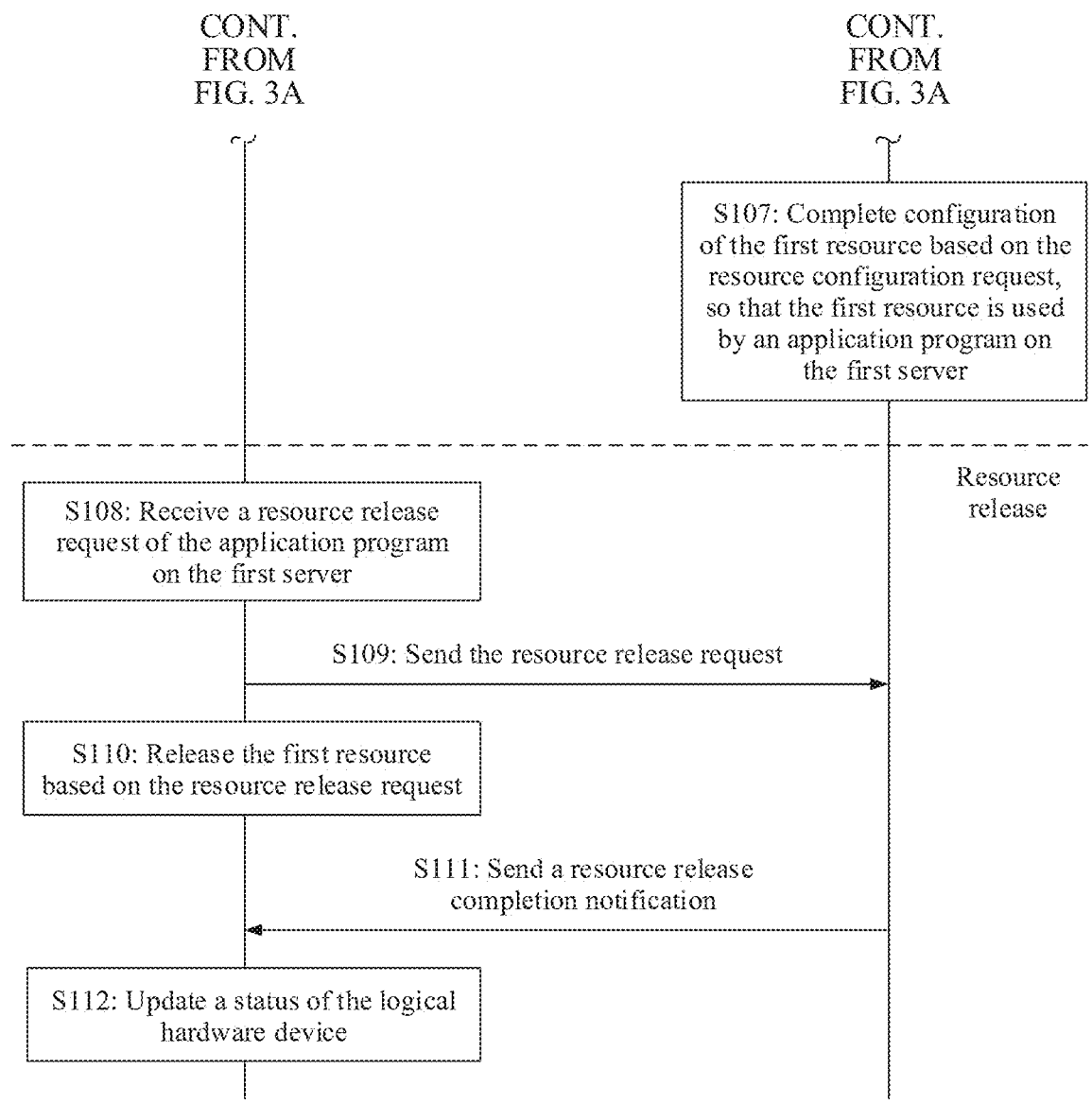

The following further describes, with reference to FIG. 3A and FIG. 3B, a resource pool management method provided in an embodiment of this application. FIG. 3A and FIG. 3B show a resource pool management method according to an embodiment of this application. As shown in the figure, the method includes the following steps.

S101: A first resource pool control unit collects hardware resource information that is on a first server on which the first resource pool control unit is located and that may be used to establish a resource pool.

It can be learned from FIG. 2A and FIG. 2B that one resource pool control unit is deployed on each server, and a plurality of resource pool control units communicate with each other through a network. In a resource pool initialization phase, the plurality of resource pool control units may preferentially select any resource pool control unit to manage the resource pool, for example, responsible for creating the resource pool and a logical hardware device, allocating a resource, and releasing a resource. In a possible embodiment, a unique identifier is configured for each resource pool control unit, and the system may specify, based on the identifier of the resource pool control unit, any resource pool control unit to manage the resource pool. For example, it is assumed that there are four servers in the system, and one resource pool control unit is deployed on each server, and identifiers are sequentially a resource pool control unit 1, a resource pool control unit 2, a resource pool control unit 3, and a resource pool control unit 4. The resource pool control unit 1 is preferentially selected to be responsible for creating the resource pool and the logical hardware device. After determining that any resource pool control unit is responsible for managing the resource pool, any resource pool control unit sends a notification message to another resource pool control unit, to notify the resource pool control unit that any resource pool control unit is responsible for managing the resource pool, and message processing is subsequently performed between different types of resource pool control units.

Optionally, in the system shown in FIG. 2A and FIG. 2B, the resource pool may also be managed by a first started resource pool control unit. The first started resource pool control unit refers to a resource pool control unit that is the first to run a resource pool control unit process among all resource pool control units. When two or more resource pool control units are started at the same time, another resource pool control unit may be selected based on an identifier of the resource pool control unit to manage the resource pool. Alternatively, a resource pool control unit with lowest load is selected based on a load status of the resource pool control unit at a current moment to manage the resource pool.

It should be noted that a resource pool control unit that manages a resource pool in a same system may be changed. For ease of description, in this embodiment of this application, the resource pool control unit that manages the resource pool at the current moment is used as the first resource pool control unit.

Further, each resource pool control unit collects hardware resource information that is on a server (for example, a first server) on which the resource pool control unit is located and that can be used to establish the resource pool. The hardware resource information includes a type, a resource quantity, a quantity, and a position of hardware. The type is used to identify the type of the hardware, for example, computing, storage, and a network. The resource quantity indicates a processing capability or a storage capability of the hardware. For example, if the hardware is a CPU, a resource quantity of the CPU may be represented by using parameters such as a quantity of processor cores, a dominant frequency, and a rotational speed. The quantity indicates the number of pieces of the hardware. The position indicates an identifier or position of a server on which the hardware is located.

S102: The first resource pool control unit receives hardware resource information that is on a second server on which a second resource pool control unit is located and that may be used to establish a resource pool.

Same as the step S101, each resource pool control unit collects hardware information that is on a server on which each resource pool control unit is located and that can be used to establish a resource pool. The second resource pool control unit is configured to indicate any resource pool control unit other than the first resource pool control unit.

S103: The first resource pool control unit creates a resource pool based on hardware resource information that is on each server and that can be used to establish a resource pool, and creates a logical hardware device.

After collecting the hardware resource information that is sent by each resource pool control unit and that can be used to establish the resource pool, the first resource pool control unit may classify the hardware resource information into one or more resource pools based on a hardware type. For example, all CPUs form a resource pool, all GPUs form another resource pool, and all disks form a resource pool.

Optionally, in a same resource pool, the resource pool may be further allocated as different groups based on different attributes. For example, in a CPU resource pool, CPUs that have four processor cores in a same CPU are grouped into one group, and CPUs that have eight processor cores in a same CPU are grouped into another group.

To further refine resource allocation, the first resource pool control unit may allocate hardware devices in a same resource pool into a plurality of logical hardware devices in any one or more of the following manners.

Manner 1: A same hardware device is allocated as a plurality of logical hardware devices.

For example, the hardware device is a disk, and a same disk hardware device may be allocated as a plurality of logical disks for use by application programs of a plurality of application servers.

Manner 2: A plurality of hardware devices form one logical hardware device.

To improve a processing capability of a computing resource, a plurality of artificial intelligence chips may form one logical artificial intelligence chip, to jointly complete a data processing process, improve processing efficiency, and reduce processing duration. Alternatively, to increase a resource quantity of the disk, a plurality of disks form one logical disk for use by the application program. In the manner 2, the hardware devices may belong to a same server, or may belong to different servers.

Manner 3: A same hardware device is used as one logical hardware device.

The same hardware device may be shared by a plurality of application programs, allowing the plurality of application programs to use the hardware device at the same time. Alternatively, the same hardware device may be provided for only one application program in an exclusive manner, and only the application program is allowed to use the hardware device.

S104: The first resource pool control unit receives a resource application request of an application program on the second server.

The resource application request received by the first resource pool control unit is specifically a resource application request, of the application program on the second server, sent by the second resource pool control unit. The resource application request includes an identifier of the application program, a type and a resource quantity of a required resource. The identifier of the application program is used to uniquely identify an application program. The type of the required resource is used to identify a type of a hardware resource required by the application program, for example, a computing resource, a network resource, or a storage resource. The resource quantity of the required resource is used to identify a specific requirement of a resource required by the application program. Specifically, when the application program requires the computing resource, the resource quantity is used to indicate a computing capability of the required computing resource. For example, when the application program requires a CPU, the resource quantity is used to indicate a quantity of required CPUs, a quantity of cores and a dominant frequency that are of each CPU, and a quantity of threads that can be processed by each CPU. Optionally, the resource application request may further include an identifier of an application server on which the application program is located.

S105: The first resource pool control unit allocates one or more logical hardware devices as a first resource according to a preset rule.

The first resource pool control unit may allocate one or more logical hardware devices in the resource pool as the first resource based on the resource application request and the preset rule, to ensure that the first resource can meet a requirement of the resource application request.

The preset rule includes any one or more of the following rules.

Rule 1: A logical hardware device formed by a resource of a hardware device that is relatively close to a server on which the application program is located is preferentially selected to form the first resource.

It can be learned from the foregoing description that the resource pool includes resources of a plurality of hardware devices that may be used by each server to form the resource pool. To consider a transmission delay of a resource used by the application program, a logical hardware device including a hardware device provided by a server that is relatively close to a server on which the application program is located may be selected as the first resource, a specific distance may be distinguished by using positions of different servers. For example, a resource provided by a same server is preferentially selected. If the resource provided by the same server cannot meet a requirement of the resource application request, resources provided by servers in a same cabinet are preferentially selected.

Optionally, when a hardware device of the application server is also configured to form the resource pool, a logical hardware device formed by a hardware device provided by a server on which the application program is located may be preferentially selected as the first resource. In this case, the resource pool control unit accesses a hardware resource through a PCIe protocol. Compared with accessing a hardware resource of another server through the network 300, because a data transmission path is shortened, a speed is faster, and data processing efficiency may be improved.

Rule 2: A resource pool control unit on the application server may establish a binding relationship with a resource pool control unit in one or more specified resource servers. When an application program on a server on which any resource pool control unit is located applies for a resource, the first resource pool control unit provides, based on the binding relationship, a hardware resource for the application server from only a logical hard disk that includes a hardware device of the specified resource server.

In the system shown in FIG. 2A and FIG. 2B, the resource pool control unit on the application server pre-establishes an association relationship with one or more resource pool control units on the resource server. When the application program on the application server needs a resource, the hardware resource is allocated only from a resource server on which the resource pool control unit bound to the resource pool control unit on the application server is located. In the foregoing allocation manner, one or more fixed resource servers may be specified to provide the hardware resource for the application program running on the application server based on a type of a resource requirement of the application program running on the application server, to ensure an application requirement of the application program. In addition, in a data center or public cloud field, for a relatively important application program, a resource may also be allocated in the foregoing manner, to preferentially meet a resource requirement of the important application program, and improve service quality of an entire data center or public cloud.

Optionally, after allocating the first resource, the first resource pool control unit updates a status of the one or more logical hardware devices that form the first resource to busy, to indicate that the logical hardware device has been used by another application program.

S106. The first resource pool control unit sends a resource configuration request to the second resource pool control unit based on the first resource.

After determining the first resource, the first resource pool control unit sends the resource configuration request to the second resource pool control unit. The resource configuration request carries an identifier of the logical hardware device and an identifier of the server that provides the hardware resource, so that when the application program uses the hardware resource, the second resource pool control unit may access the hardware device based on the identifier of the server. The identifier of the server may be identified by using a media access control (MAC) address or an internet protocol (IP) address. Optionally, the resource configuration request may further carry an identifier of the resource pool control unit.

S107: The second resource pool control unit completes configuration of the first resource based on the resource configuration request, so that the first resource is used by the application program on the second server.

After receiving the resource configuration request, the second resource pool control unit records the identifier of the logical hardware device and the identifier of the server that provides the hardware resource. In the application server, the resource pool control unit is connected to a virtual hardware device. When the application program needs to access a hardware resource, the resource pool control unit first determines a logical hardware device corresponding to an access request, determines a server on which the logical hardware device is located, and sends the access request to the server based on an identifier of the server. Then, a processor of the server completes a read or write operation.

In a possible embodiment, the first resource pool control unit further sends a resource configuration request to a resource pool control unit that provides a hardware resource, so that the resource pool control unit records a to-be-provided hardware device and a resource pool control unit for which the hardware device is provided.

S108: The first resource pool control unit receives a resource release request of the application program on the second server.

When the application program of the second server completes resource use, the application program of the second server sends the resource release request to the first resource pool control unit through the second resource pool control unit, and the resource release request may carry an identifier of a used logical hardware device.

S109: The first resource pool control unit indicates that the resource pool control unit of the server that provides the first resource has completed use of the first resource.

The first resource pool control unit is responsible for releasing a resource in the resource pool. When the application program completes use of a hardware resource applied for by the application program, the first resource pool control unit is notified to release the hardware resource. For example, when the application program completes use of the first resource, the first resource pool control unit notifies the resource pool control unit of the server that provides the hardware resource that the resource use is completed. Correspondingly, the resource pool control unit of the server that provides the hardware resource updates a hardware resource binding relationship recorded by the resource pool control unit, to provide the hardware resource for another application program for use.

S110: The first resource pool control unit updates a status of the logical hardware device.

When managing the resource pool, the first resource pool control unit needs to record a status of each logical hardware device. When the application program completes use of the logical hardware device, the first resource pool control unit may update the status of the logical hardware device to idle. The status is used to identify that the logical hardware device is not currently allocated to the application program for use, and the first resource pool control unit may reallocate the logical hardware device to another application program for use.

It should be noted that, when the application program in the first resource pool control unit needs to apply for the hardware resource, the steps S106 and S109 to S111 are all completed by the first resource pool control unit.

In a possible embodiment, in addition to managing the resource pool by the first resource pool control unit, any processor may be selected in the system shown in FIG. 2A and FIG. 2B to implement resource pool management. For example, a processor with a lowest load in the system at a current moment is selected to manage the resource pool. In this case, all resource pool control units send, to the processor, hardware resource information that is collected by the resource pool control units and that is of a server on which the resource pool control units are located and that can be used to establish the resource pool. The processor is responsible for creating a resource pool and a logical hardware device, and applying for and releasing a resource. In other words, the processor performs the operation steps of the first resource pool control unit in FIG. 3A and FIG. 3B, and the selected processor receives and summarizes hardware resource information that is sent by the first resource pool control unit and the second resource pool control unit and that can be used to establish a resource pool on a server on which the first resource pool control unit and the second resource pool control unit are located. Then, the processor creates the resource pool based on the hardware resource information that is on the foregoing server and that may be used to create a resource pool, and creates the logical hardware device. When receiving a resource application request of an application program sent by any resource pool control unit, the processor allocates one or more logical hardware devices as the resource pool control unit based on the preset rule, the resource pool control unit completes resource configuration, and the application program uses a required resource. After the application program completes data processing, the resource pool control unit sends the resource release request to the processor, and the processor updates the status of the logical hardware device, to implement resource sharing in the resource pool.

In another possible embodiment, when the resource pool control unit that is responsible for managing the resource pool is faulty or cannot continue to work due to an upgrade or the like at the current moment, the plurality of resource pool control units may reselect a new resource pool control unit to manage the resource pool. For example, the plurality of resource pool control units select, based on a current load status, a resource pool control unit with a lowest load as a resource pool control unit responsible for managing the resource pool at the current moment. Alternatively, a resource pool control unit may be selected, based on the identifier of the resource pool control unit, to manage the resource pool. In this embodiment of this application, the resource pool control unit is only configured to implement processes of resource pool creation, logical hard disk creation, resource allocation, and resource releasing. In a specific embodiment, a process in which the application program uses the hardware resource does not require participation of the resource pool control unit. In other words, the resource pool control unit responsible for managing the resource pool at the current moment only needs to record composition of the resource pool and composition and status of the logical hardware device. When the resource pool control unit responsible for managing the resource pool is faulty or upgraded at the current moment, a new resource pool control unit responsible for managing the resource pool may continue to manage the resource pool only by obtaining the composition of the resource pool and the composition and the status of the logical hardware device. During specific implementation, each resource pool control unit responsible for managing the resource pool may record the composition of the resource pool, and the composition and the status of the logical hardware device by using a database, a specified file, or another form. When the resource pool control unit responsible for managing the resource pool is faulty or upgraded at the current moment, the database content or the specified file may be sent to any resource pool control unit before the system breaks down. After the resource pool control unit is determined, the resource pool control unit that stores the database content or the specified file sends the database content or the specified file to the new resource pool control unit, and the new resource pool control unit manages the resource pool.

According to the foregoing content description, in the resource pool management method provided in this application, a plurality of servers may be selected based on a service requirement, one resource pool control unit is deployed on each server, the resource pool control units communicate with each other through the network, the resource pool control units jointly manage the resource pool, and there is no central control node in the resource pool, no independent management node needs to be deployed, and service interruption caused by management node faults or upgrades is not involved. When the resource pool control unit responsible for management is faulty, other resource pool control units may select a new resource pool control unit responsible for management according to the preset rule, to take over a task of the original resource pool control unit and continue to manage the resource pool. This improves reliability of the entire system. In addition, the resource pool control unit may be implemented through an FPGA or an ASCI circuit. Compared with a manner of deploying a management node through an independent server, system deployment costs are reduced. On the other hand, a quantity of resource pool control units may be flexibly configured. As long as a resource pool control unit is added to the server, the resource pool control unit can participate in resource pool management, and a layout manner is more flexible. During specific implementation, the quantity of resource pool control units may be set based on a service requirement. Compared with a manner in which the management node needs to be deployed through the independent server in a conventional technology, a deployment mode is more flexible, and costs are lower. In still another aspect, in a resource pool management process, a finer-grained management manner is used. The hardware resource is allocated as logical hardware devices in different forms for use by the application program, and a resource of a same physical device are allowed to be allocated as a plurality of logical hardware devices, or resources of a plurality of physical devices form a logical physical device. Alternatively, a resource of a physical device is used as a logical physical device, and resource use forms are diversified. In the data center or the public cloud field, resources may be allocated to different applications based on a user requirement, to improve resource utilization of the entire system.

The foregoing content describes the structure and the management manner of the resource pool system provided in this application. The following further describes, with reference to the accompanying drawings, how to implement a message transmission method for a virtual hardware device of a single communications device on the communications device, to improve a method for accelerating, by an access component of the communications device, access to a hardware device of another hardware device in a resource pool, and reduce an access delay of hardware access performed by the communications device in the resource pool on another communications device.

Figure 4:
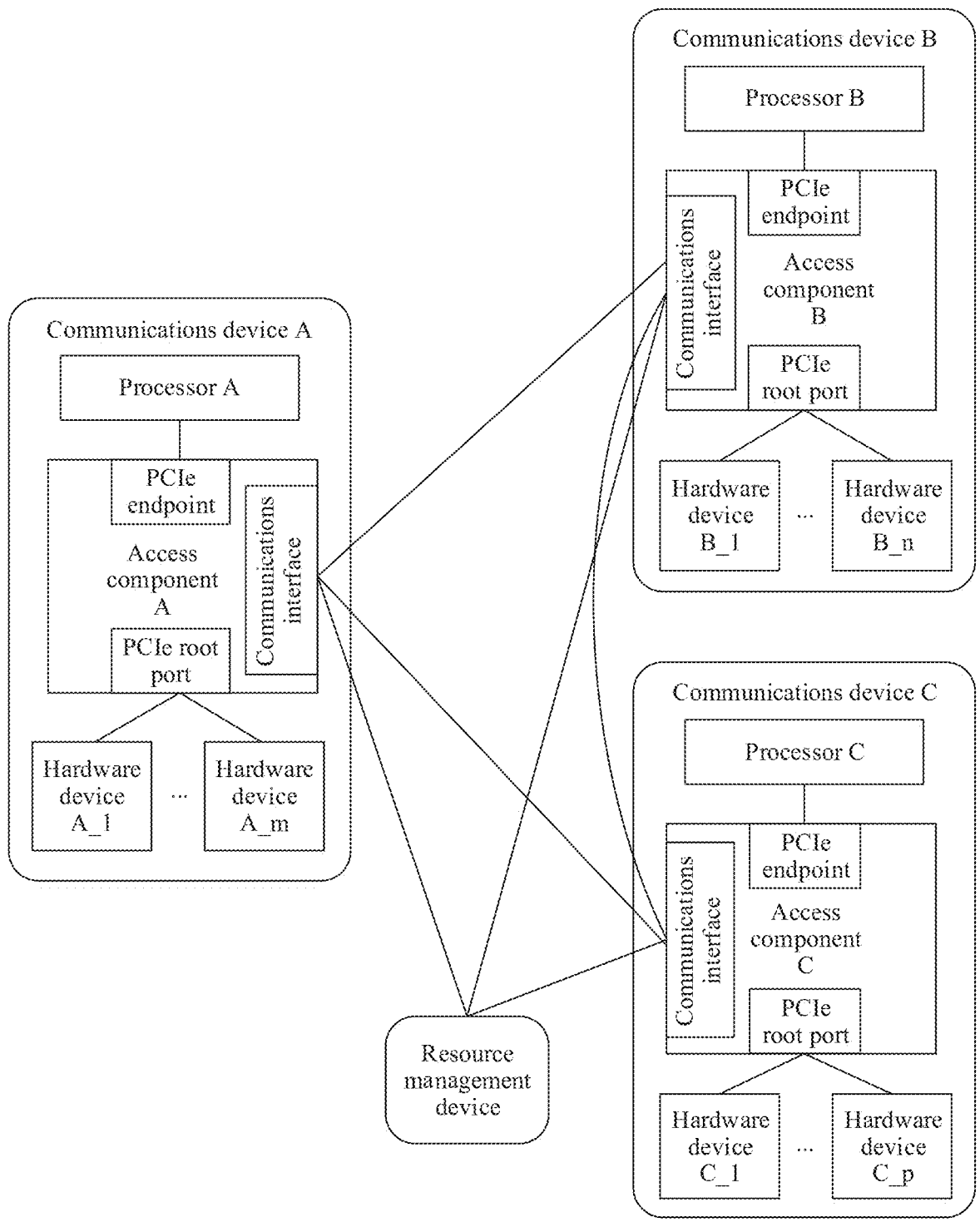
FIG. 4 is an architectural diagram of another resource pool management system according to an embodiment of this application.

FIG. 4 is an architectural diagram of another resource pool management system according to this application. As shown in the figure, a communications system includes a plurality of communications devices (a communications device A, a communications device B, and a communications device C shown in the figure) and a resource management device. Each communications device includes a processor, an access component, and at least one hardware device. The hardware device may include at least one of an SSD, a central processing unit, a GPU, and a NIC.

For a specific implementation solution of how a plurality of hardware devices in FIG. 4 form a hardware resource pool and an allocation manner of a virtual hardware device, refer to the methods shown in FIG. 1 to FIG. 3A and FIG. 3B. At least one available hardware device of a same type in the system may form one virtual logical device, and the virtual logical device is allocated to one communications device. Alternatively, all available hardware devices of the same type may form one or more logical hardware devices. Then, each logical hardware device is allocated as a plurality of sub-logical hardware devices according to a preset rule, and each sub-logical hardware device may be referred to as a virtual hardware device. For example, an available SSD device in a current system is an SSD 1 of a communications device 1, an SSD 1 of a communications device 2, and an SSD 1 of a communications device 3. The foregoing three SSDs form a logical SSD, and then the logical SSD is allocated as two sub-logical SSDs according to the preset rule. Each sub-logical SSD is referred to as a virtual SSD, and may be allocated to a communications device for use.

The virtual hardware device in FIG. 4 is described through an example in which at least one available hardware device of a same type in the system shown in FIG. 4 forms a hardware resource pool, the hardware resource pool includes one or more virtual hardware devices, and each virtual hardware device includes at least one hardware device. For example, the resource management device in the communications system forms the SSD 1 of the communications device 1 and the SSD 1 of the communications device 2 into a virtual SSD disk, and allocates the virtual SSD disk to the communications device 1 for use, and a resource quantity of the virtual SSD disk is a sum of resource quantities of two SSD disks.

Because the communications system uses a resource integration manner, the resource management device in the communications system may integrate hardware devices (namely, hardware resources) of a same device type on the communications devices in the communications system, to generate the hardware resource pool. For example, the resource management device may integrate solid state disk (solid state disk, SSD) resources on all communications devices as one SSD resource pool, or integrate NIC resources on all communications devices into one NIC resource pool.

When a communications device requests to allocate a hardware resource, the resource management device obtains, from the hardware resource pool through splitting, a hardware resource meeting a hardware resource requirement of the communications device, and allocates the hardware resource obtained through splitting to the communications device as a virtual hardware device. After allocating the virtual hardware device to the communications device, the resource management device further sends resource configuration information of the communications device to the communications device. The resource management device may be any one of the plurality of communications devices, or may be another device that has a control and management function and that is independent of the communications device in the communications system. Specifically, the resource management device may be any resource pool control unit that is used to manage a resource pool at a current moment and that is in FIG. 1 or FIG. 2A and FIG. 2B.

A hardware resource allocated by the resource management device to a target communications device may include some or all hardware resources in the at least one hardware device. The at least one hardware device may be located in a same communications device, or may be located in different communications devices. This is not limited in this application. In addition, the at least one hardware device may include a hardware device located on the target communications device, or may not include the hardware device located on the target communications device. This is not limited in this application either.

In the following descriptions of the embodiments of this application, an example in which the communications device A is an application server, the communications device A, the communications device B, and the communications device C are resource servers, and the hardware device is an SSD is used for further detailed description.

For example, when allocating a hardware resource to the communications device A, the resource management device allocates all hardware resources in an SSD A_1 on the communications device A, an SSD B_1 on the communications device B, and an SSD C_1 on the communications device C as virtual SSDs to the communications device A.

After allocating the hardware resource to the communications device A, the resource management device generates resource configuration information of the communications device A, and sends the resource configuration information of the communications device A to the communications device A. An access component A of the communications device A stores the resource configuration information. The access component A may send a notification to a processor A based on the resource configuration information, so that the processor A determines information such as a device type (SSD) of a virtual hardware device allocated by the resource management device to the communications device A and a size of a provided hardware resource.

The processor A receives a request message sent by a running service application, and the request message may be a read request message, or may be a write request message. The processor A transmits the request message to the access component A, and the access component A may determine, based on the resource configuration information, an SSD that is included in the virtual SSD and to which a transmission object of the request message specifically belongs. The following scenarios are included.

Scenario 1: When the transmission object of the request message received by the access component A and the processor A are located on a same communications device (for example, the transmission object of the request message is the SSD A_1), the access component A may directly send the request message to the SSD A_1, so that the SSD A_1 performs the operation.

Scenario 2: When the transmission object of the request message received by the access component A and the processor A are located on different communications devices (for example, the transmission object of the request message is the SSD B_1 on the communications device B), the access component A sends the request message to an access component B of the communications device B. After receiving the request message, the access component B of the communications device B sends the request message to the SSD B_1, so that the SSD B_1 performs the operation.

It should be noted that an access component and a processor of each communications device and the access component and each SSD are connected through a peripheral interface, to perform communication between components.

Optionally, the peripheral interface may be a PCIe interface. In this case, the access component of each communications device includes a PCIe endpoint and a PCIe root port, as shown in the figure. The PCIe endpoint is configured to connect to the processor, and establish a transmission channel between the processor and the access component. The PCIe root port is configured to connect each SSD on the communications device, and establish a transmission channel between the access component and each SSD.

In addition, when an application device and a resource device are different communications devices (as described in the scenario 2), to implement that an access component of the application device may transmit a message to a hardware device located on the resource device, there is a communication connection between the application device and the resource device in the communications system. In other words, there is a communication connection between the application device and the access component of the resource device. For example, as shown in FIG. 4, the access component A of the communications device A, the access component B of the communications device B, and an access component C of the communications device C are connected through a communications interface.

Each communications device may be used as a resource device to provide a hardware device for another application device, or may be used as an application device to be provided a hardware device by another communications device. Therefore, optionally, access components on any two communications devices in the communications system may be connected to each other through a communications interface. For example, as shown in FIG. 4, the access component B of the communications device B is connected to the access component C of the communications device C through a communications interface.

It may be understood that two access components may communicate with each other through a direct connection, or may communicate with each other through a network. This is not limited in this application. When the access components communicate with each other through the network, the network may include various network forwarding devices (for example, a switch and a router).

The access components use different communication protocols based on different connection manners between the access components. Therefore, when sending a message, the access component further needs to encapsulate the message into a packet according to an agreed communication protocol. After receiving the packet, the access component also needs to decapsulate the packet into the message according to the agreed communication protocol.

For example, when the access components communicate with each other through the network, a communications protocol such as an Ethernet protocol or a transmission control protocol/internet protocol (TCP/IP) may be used between the access components.

Figure 5:
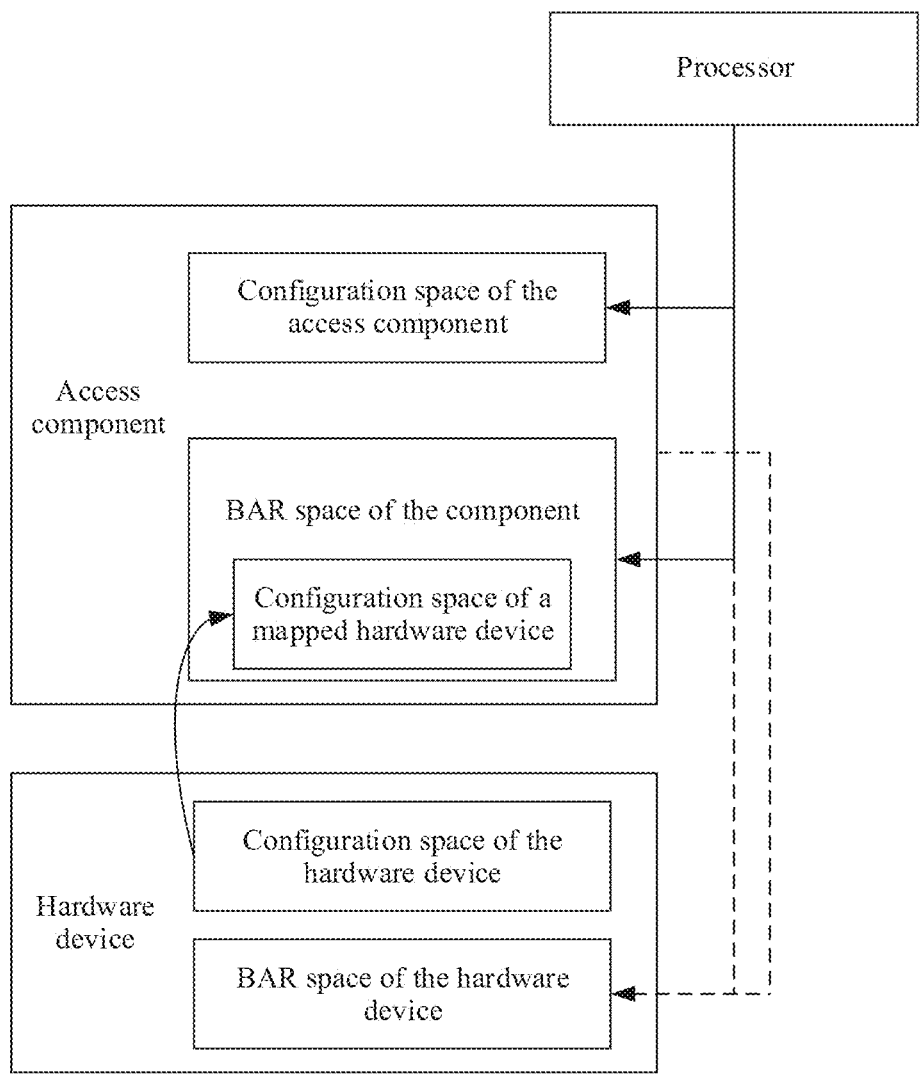
FIG. 5 is a schematic structural diagram of an access component according to an embodiment of this application.

FIG. 5 is a schematic structural diagram of an access component according to this application. As shown in the figure, FIG. 5 is a schematic diagram of space access inside the communications device when a processor and an access component of the communications device are connected to each other through a PCIe interface, and the access component and a hardware device are connected to each other through a PCIe interface.

In a PCIe structure, an access component and a hardware device are referred to as PCIe devices. Each PCIe device is configured with two types of space: configuration space and base address register (BAR) space.

The configuration space of the PCIe device is a set of registers. These registers store a device type of the PCIe device, other basic information (such as a device identifier, vendor information, and a version number) of the PCIe device, and a base address of the BAR space.

The BAR space of the PCIe device is also register space. The register includes information such as a base address of a queue that can be managed by the PCIe device and a pointer of the queue.

As shown in FIG. 5, the access component is an endpoint of the processor, and the processor may access configuration space of the access component through a root complex (RC)

in a PCIe structure. The processor may configure a base address of the BAR space of the access component through the configuration space of the access component, and implement configuration and access to the BAR space of the access component.

The access component may independently access configuration space of the hardware device, and map the configuration space to the BAR space of the access component. In this way, the access component may indirectly access the configuration space of the hardware device by accessing the BAR space of the access component. When the access component indirectly accesses the configuration space of the hardware device, a base address of a BAR space of the hardware device may be configured, to implement configuration and access to the BAR space of the hardware device.

After the resource management device in the communications system allocates a virtual hardware device to the communications device (the communications device A is still used as an example), the access component A generates configuration space. The configuration space includes a device type of the virtual hardware device and other basic information. In this way, the processor A may access the configuration space of the access component A through the RC, identify the device type of the virtual hardware device and other basic information, and generate, based on the information, a request message used to implement some operations. Optionally, the RC may be integrated into the processor A, or may be hardware independent of the processor A. This is not limited in this application.

In addition, in a process in which the processor A transmits a message to the access component A, the RC also needs to be used for implementation. For example, when the processor A needs to transmit the message to the access component A, the processor A needs to store the message in a memory of the processor A, and then write the message into the access component A through the RC. When the access component A needs to read the message from the access component A, the access component A also needs to read the message into the memory of the processor A through the RC, and then the processor A reads the message from the memory.

In a process of transmitting a message between the access component A and any hardware device (for example, a hardware device A_1) on the communications device A, the access component A also needs to have an RC function, and a memory of the access component A needs to participate in implementation. A specific process is similar to a process in which the processor A transmits the message to the access component A. Details are not described herein again.

In addition, during message transmission, if a message (for example, a request message or a response message) is transmitted between the processor A and the access component A in a queue storage manner (in other words, the message is stored in a queue in the memory of the processor A), the processor A needs to frequently access BAR space of the access component A, so that the access component A determines a base address of the queue in the memory of the processor A, and then the access component A may read the message from the queue or write the message into the queue.

Similarly, if a message (for example, the request message or the response message) is transmitted between the access component A and the hardware device A_1 in the queue storage manner (in other words, the message is stored in a queue in the memory of the access component A), the access component A needs to frequently access BAR space of the hardware device A_1, so that the hardware device A determines a base address of the queue in the memory of the component A, and then the hardware device A_1 may read the message from the queue or write the message into the queue.

An embodiment of this application provides a message transmission method. The method is applicable to the communications system shown in FIG. 4. In the following descriptions of this embodiment of this application, an example in which the communications device A is an application server, the communications device A, the communications device B, and the communications device C are resource servers, and the hardware device is an SSD is still used for further detailed description.

The message refers to content transmitted between the processor and a hardware device forming the virtual hardware device, and is used to implement a read/write operation that the processor expects the virtual hardware device to perform. Specifically, the message may include a request message before the operation is performed, a data execution message during the operation is performed, a response message after the operation is performed, and the like. This is not limited in this application. When the processor needs to perform the read operation on the virtual hardware device, the request message is a read request message; the data execution message is a data storage request that carries target data and that is sent by the hardware device, and a data storage response that is returned after the processor stores the target data in the memory; and the response message is a read response message sent by the hardware device after the hardware device receives the data storage response and confirms that the processor reads the target data. When the processor needs to perform the write operation on the virtual hardware device, the request message is a write request message; the data execution message is a data read request sent by the hardware device and a data read response that is returned by the processor and that carries target data; and the response message is a write response message sent by the hardware device after the hardware device successfully stores the target data.

It can be learned from the foregoing description of the access component that the processor and the hardware device are not directly connected, but are connected through the access component. Therefore, message transmission includes two processes: a process 1 and a process 2. The process 1 is message transmission between the processor and the access component of the communications device on which the processor is located. The process 2 is message transmission between the access component of the communications device on which the processor is located and the hardware device.

Optionally, the message transmitted in the process 1 may include a first address indicating a storage position of target data on the virtual hardware device, and a second address indicating a storage position of the target data in the memory of the processor. For example, when the message is a write request message, the target data is data to be written by the processor. The first address is a start address at which the target data is written into the virtual hardware device, and the second address is a start address at which the target data is stored in the memory of the memory. For example, when the message is a read request message, the target data is data to be read by the processor. The first address is a start address at which the target data is stored on the virtual hardware device, and the second address is a start address at which the target data is written into the memory of the processor.

In addition, because the virtual hardware device allocated to the communications device is a sum of hardware resources provided for the communications device (a sum of hardware resources separately provided by each hardware device on the at least one hardware device for the communications device), a value range of the first address (namely, a storage address of the virtual hardware device) is 0 to (a sum of hardware resources provided by each of the at least one hardware device for the communications device−1).

For example, when allocating a hardware resource to the communications device 1, the resource management device in the communications system allocates, to the communications device 1, a 2 TB hardware resource on the hardware device A on the communications device 2 and a 6 TB hardware resource on a hardware device B on the communications device 3. A value range of a storage address of a virtual hardware device included in a request message sent by the communications device 1 should be 0 TB to (8 TB−1).

Optionally, the message transmitted in the process 2 may include a third address used to indicate the hardware device and a fourth address used to indicate a storage position of the target data on the hardware device. The third address may enable the access component of the communications device on which the processor is located to accurately send the message to the hardware device. Optionally, the third address includes indication information of the hardware device. The fourth address may enable the hardware device to complete a corresponding operation after receiving the message. For example, when the message is a write request message, the fourth address is a start address at which the target data is written into the hardware device. For another example, when the message is a read request message, the fourth address is a start address at which the target data is stored on the hardware device. It should be noted that a value range of the fourth address (namely, the storage address of the hardware device) is 0 to (a hardware resource provided by the hardware device−1).

It can be learned from the foregoing description that the resource management device in the communications system integrates SSDs on all communications devices into an SSD resource pool, allocates all hardware resources in the SSD A_1 on the communications device A, the SSD B_1 on the communications device B, and the SSD C_1 on the communications device C in the SSD resource pool to the communications device A as virtual SSDs, and sends the resource configuration information of the communications device A to the access component A of the communications device A. The processor A accesses the configuration space of the access component A through the RC, and identifies information such as a device type of the virtual SSD and a size of a provided hardware resource.

Figure 6A:
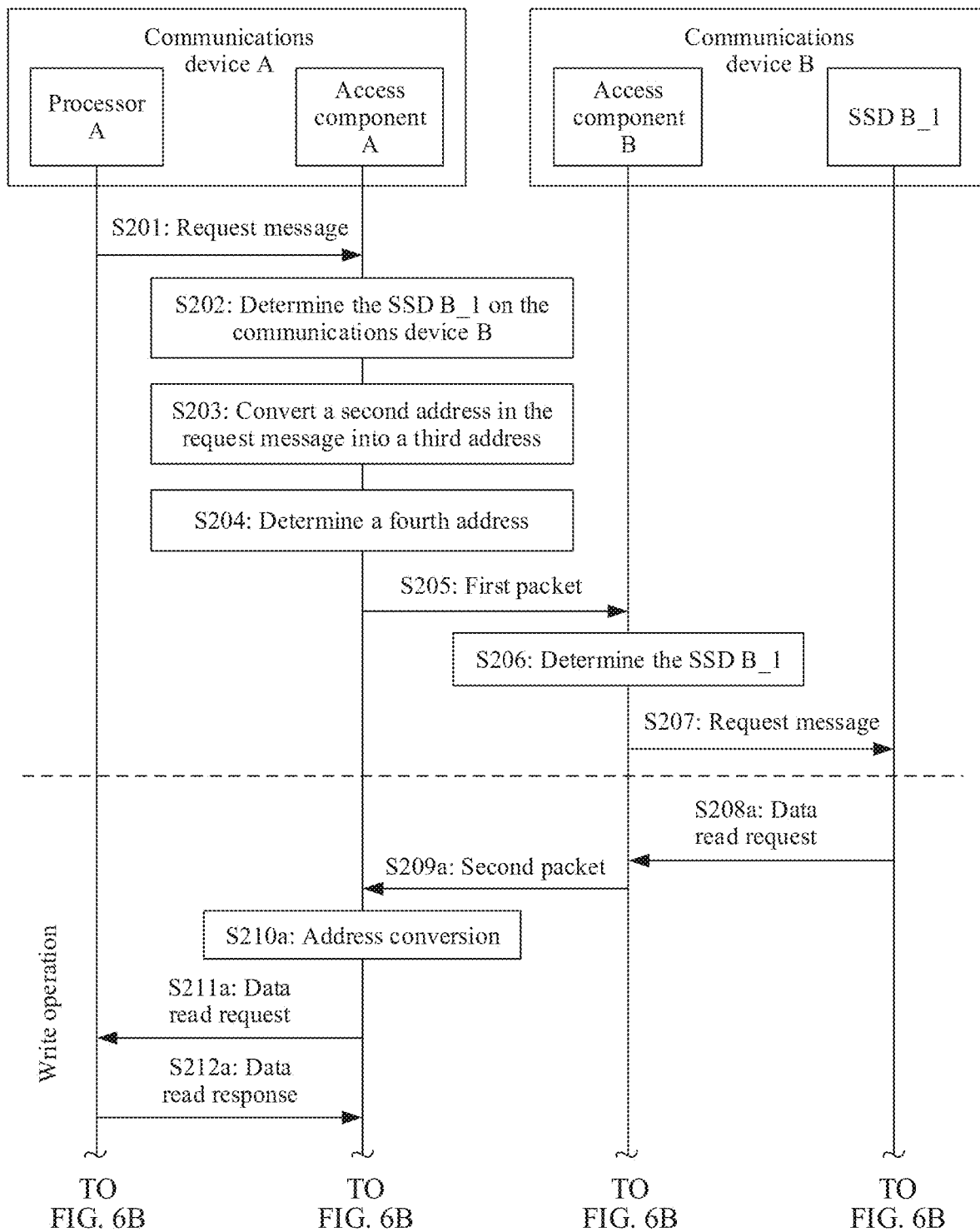
FIG. 6A and FIG. 6B are schematic flowcharts of a message transmission method in a resource pool system according to an embodiment of this application.
Figure 6B:
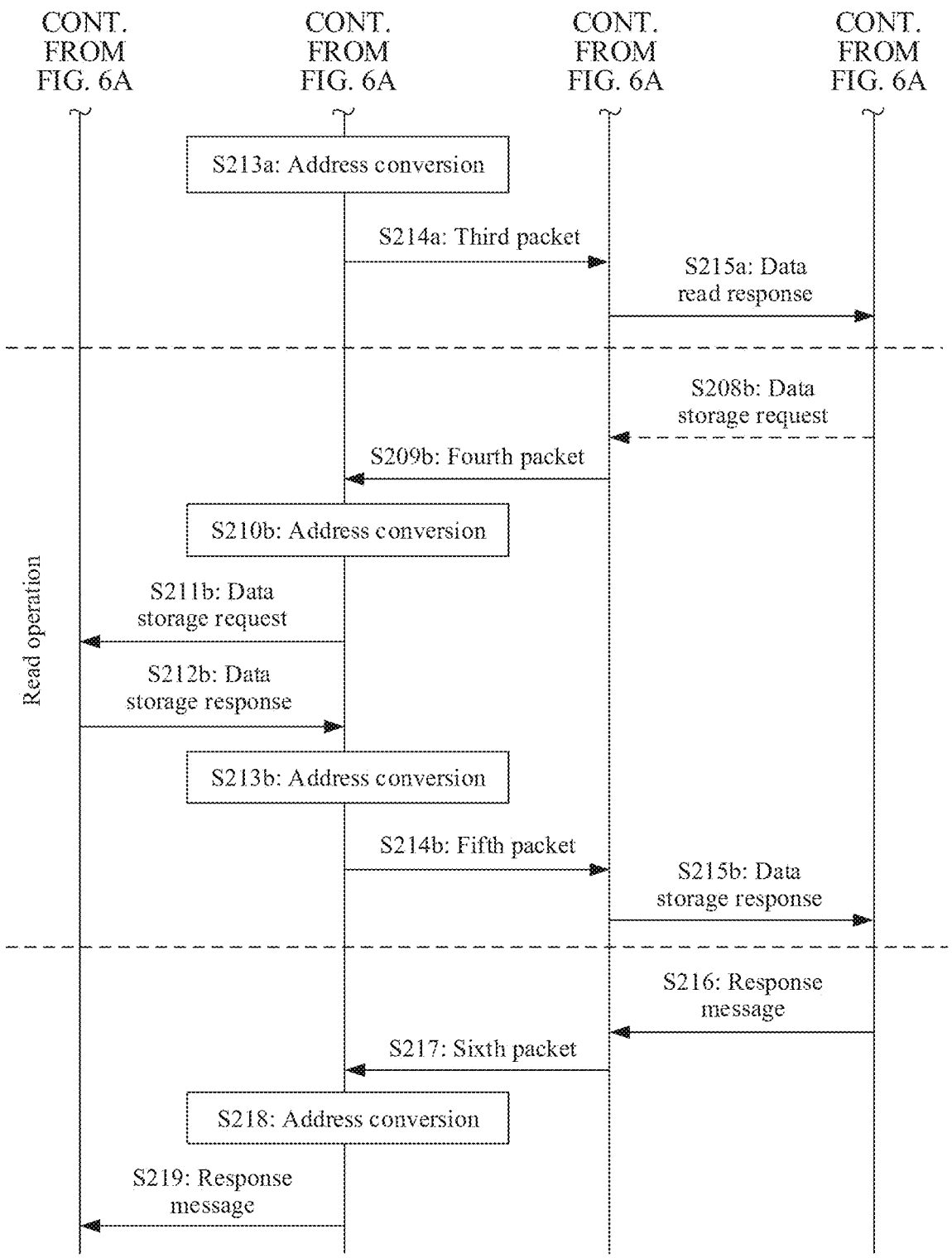

FIG. 6A and FIG. 6B are schematic flowcharts of a message transmission method in a resource pool system according to this application. As shown in the figure, operation steps of the method include the following steps.

S201: When a virtual SSD needs to perform an operation (a read operation or a write operation), a processor A on a communications device A transmits a request message corresponding to the operation to an access component A, and the access component A obtains the request message transmitted by the processor A.

The request message includes a first address and a second address. The first address is used to indicate a storage position of target data in the virtual SSD. In other words, the first address is a storage address of the virtual SSD. The second address is used to indicate a storage position of the target data in a memory of the processor A. In other words, the second address is a storage address of the memory of the processor A.

When performing the S201, the processor A may transmit the request message to the access component A through a peripheral interface between the processor A and the access component A and in a transmission manner corresponding to the peripheral interface. The transmission manner of the request message may include but is not limited to the following two manners.

Manner 1: The processor A sends the request message to the access component A.

Manner 2: When a PCIe interface is used between the processor A and the access component A, the request message is transmitted in the following steps:

The processor A stores the request message in the memory of the processor A, and may specifically store the request message by using a queue (for ease of differentiation, the queue may be subsequently referred to as a first command queue). Then, the processor A notifies the access component A to read the request message.

After obtaining the notification of reading the request message from the processor A, the access component A reads the request message from the first command queue.

When a PCIe interface of the communications device A is combined with a non-volatile memory express (NVMe), the first command queue may be a submission queue (SQ) stored in the memory of the processor A.

Optionally, in the manner 2, the processor A may notify, in the following steps, the access component A to read the request message. After storing the request message in the first command queue, the processor A updates a write pointer position of the first command queue, and sends the updated write pointer position of the first command queue to the access component A.

In this way, after receiving the updated write pointer position of the first command queue from the processor A, the access component A may read the request message from the first command queue based on the updated write pointer position of the first command queue.

It should be noted that messages in a command queue are stored based on a sequence of messages, and there is no idle position between two adjacent positions in which the messages are stored. A write pointer position of the command queue is the first idle position in the command queue. Therefore, the access component A may determine, through whether the write pointer position of the command queue changes, whether a new message is stored in the command queue, and may further determine, based on an updated write pointer position of the command queue, a position of the newly stored message in the command queue, to accurately read the message newly stored in the command queue.

S202: The access component A determines that the storage position indicated by the first address belongs to a target SSD (for example, an SSD B_1 on the communications device B) of another communications device. In other words, the scenario 2 is currently met.

Optionally, the access component A may determine the target SSD in the following method.

The access component A determines, based on stored resource configuration information and the first address, that a transmission object of the request message is an SSD B_1 on the communications device B, and the resource configuration information includes a storage address range corresponding to each of at least one SSD. In this embodiment, the resource configuration information includes a storage address range corresponding to each of three SSDs forming the virtual SSD. The resource configuration information is generated by a resource management device on the communications system when the resource management device allocates a hardware resource to the communications device, and is sent to an access component of the communications device. The resource configuration information of the communications device is used to indicate a configuration status of a hardware resource of a virtual hardware device of the communications device. Because the hardware resource allocated to the communications device is provided by at least one hardware device allocated to the communications device, the resource configuration information includes a storage address range of each hardware device on the at least one hardware device on the virtual hardware device.

When performing the S202, the access component A first determines a storage address range in which the first address is located, and then determines that an SSD corresponding to the storage address range is a transmission object of the request message.

For example, a total storage address range of the virtual SSD is 0 TB to 12 TB−1, and the three SSDs provide the hardware resource for the communications device A in a sequence of the SSD A_1, the SSD B_1, and the SSD C_1. The resource configuration information is shown in the following Table 1.

TABLE 1

| Description information of the SSD | Storage address range |
|---|---|
| SSD A_1 | 0 TB to 4 TB - 1 |
| SSD B_1 | 4 TB to 8 TB - 1 |
| SSD C_1 | 8 TB to 12 TB - 1 |

When the first address is 5 TB, the access component A may determine that the storage address range in which the first address is located is 4 TB to 8 TB−1, and then the access component A may use the SSD B_1 corresponding to the storage address range 4 TB to 8 TB−1 as the transmission object of the request message.

Optionally, the resource configuration information further includes description information of each of the three SSDs forming the virtual SSD, for example, an identifier of the SSD, an identifier of a device on which the SSD is located, a number of the SSD, and an identifier of a board connected to the SSD.

The access component A may determine, by using the description information of the SSD B_1, that the SSD B_1 is located on the communications device B. In this way, the access component A may subsequently accurately send the request message to the access component B of the communications device B.

In addition, the access component A may further generate indication information of the SSD B_1 based on the description information of the SSD B_1, so that the indication information of the SSD B_1 may be subsequently added to the request message. In this way, when there are a plurality of SSDs on the communications device B, the communications device B may accurately transmit the request message to the SSD B_1 based on the indication information of the SSD B_1 in the received request message.

It can be learned from the foregoing description that the indication information of the SSD B_1 is used by the communications device B to accurately determine the SSD B_1. Therefore, the indication information of the SSD B_1 may include but is not limited to at least one of the following: an identifier of the SSD B_1 and an identifier of a board connected to the SSD B_1.

S203: The access component A converts the second address in the request message into a third address based on a first mapping table, where the third address is used to indicate the SSD B_1, and the first mapping table is used to record a mapping relationship between the second address and the third address.

The first mapping table may be prestored in the access component A, or may be generated by the access component A before performing the S203. Specifically, the access component A may generate the first mapping table in the following steps.

The access component A determines the indication information of the SSD B_1.

The access component A adds the indication information of the SSD B_1 to the second address, to obtain the third address.

The access component A generates the first mapping table based on the second address and the third address.

Currently, an address field reserved for a storage address in various messages is a first bit (bit), and usually, a second bit actually required by the storage address is less than the first bit. The indication information of the SSD B_1 is added to the request message, a bit length occupied by the request message is increased, and transmission overheads of the transmission request message is increased. To avoid this situation and improve bit resource utilization of the address field, this embodiment of this application provides the foregoing manner of generating the third address.

The access component A adds the indication information of the SSD B_1 to an idle bit field in an address field in which the second address is located, to obtain the third address.

For example, if the address field reserved for the storage address in the request message is 64-bit, but the second address actually occupies only 48-bit, there is still a 16-bit idle bit field in the address field. The access component A may occupy all or some bit fields in the 16-bit, and place the indication information of the SSD B_1.

In addition, in a function virtualization scenario, a function of the processor A may be allocated as a plurality of functions through virtualization, including at least one physical function (PF) and at least one virtual function (VF). The request message may be sent by the processor A when using a function. To identify a function used when the processor A sends the request message, the request message may further include an identifier of the function (a virtual function or a physical function). Similarly, to avoid increasing the bit length occupied by the request message and improve bit resource utilization of the address field of the storage address, in this embodiment of this application, when obtaining the third address, the access component A may further add the identifier of the function to the idle bit field in the address field in which the second address is located, to obtain the third address that includes both the indication information of the SSD B_1 and the identifier of the function.

Optionally, an example in which there is still the 16-bit idle bit field in the address field is still used for description. When the access component A occupies some bit fields in the 16-bit to place the indication information of the SSD B_1, the access component A may also occupy some or all remaining bit fields in the 16-bit, to place the identifier of the function.

In an example, the access component A adds, to the request message, the indication information of the SSD B_1 and the identifier of the function used by the processor A. In this case, bit fields occupied by various pieces of information in the 64-bit address field are shown in Table 2, and all information in the address field constitutes the third address.

TABLE 2

| [63:60] | [59:56] | [55:48] | [47:0] |
|---|---|---|---|
| Identifier of the board connected to the SSD B_1 | Identifier of the SSD B_1 | Identifier of a (physical or virtual) function | Second address |

S204: The access component A determines a fourth address based on the first address. The fourth address is used to indicate a storage position of target data in the SSD B_1. The fourth address may also be referred to as a storage address of the SSD B_1.

If the virtual SSD includes one SSD (the SSD B_1), a size of a hardware resource provided by the virtual SSD is the same as a size of a hardware resource provided by the SSD B_1. Therefore, the fourth address is the same as the first address.

However, in this embodiment of this application, the virtual SSD includes three SSDs. Therefore, the size of the hardware resource provided by the virtual SSD is different from a size of a hardware resource provided by each SSD. Therefore, the SSD B_1 may fail to identify the storage address of the virtual hardware device in the request message. For example, if the SSD B_1 can provide a 4 TB hardware resource, the SSD may identify storage addresses whose values are 0 TB to 4 TB−1. It can be learned from table 1 that when the access component A determines that an operation object of the request message is the SSD B_1, the storage address range of the virtual SSD in the request message is 4 TB to 8 TB−1. Apparently, when the SSD B_1 obtains the request message, the SSD B_1 may fail to successfully perform the operation corresponding to the request message because the storage address of the virtual SSD in the request message cannot be identified.

To enable the SSD B_1 to successfully perform the operation corresponding to the request message, the access component A further needs to determine the fourth address based on the first address in the request message.

The access component A converts the first address into the fourth address based on a second mapping table. The second mapping table is used to describe a mapping relationship between an address indicating the storage position of the virtual SSD and an address indicating the storage position of the SSD B_1.

The second mapping table may be prestored, or may be generated by the access component A when generating the fourth address. It should be noted that the second mapping table is generated based on a size of a hardware resource that is provided by each SSD for the communications device A and that is specified in the resource configuration information, and a sequence of providing the hardware resource by each SSD for the communications device A. The second mapping table may indicate the following mapping relationship.

The fourth address=the first address−a sum of sizes of hardware resources provided by the SSD that provides the hardware resource for the communications device A before the target SSD.

It should be further noted that, if the target SSD is the first SSD that provides the hardware resource, it can be learned from the foregoing mapping relationship that the fourth address is the same as the first address.

For example, Table 1 is still used as an example. When the first address is 5 TB, the access component A may obtain, based on the second mapping table: fourth address=first address−4 TB (a size of a hardware resource provided by the SSD A_1), that the fourth address is 1 TB.

It should be understood that when the target SSD provides some hardware resources of the target SSD for the communications device A, the resource configuration information further includes an offset position corresponding to the target SSD. In this case, the mapping relationship indicated by the second mapping table is: fourth address=first address−sum of sizes of hardware resources provided by the SSD that provides the hardware resource for the communications device A before the target SSD+offset position corresponding to the target SSD.

S205: The access component A sends a first packet to the access component B of the communications device B, where the first packet includes the third address and the fourth address, so that the access component B executes, based on the third address and the fourth address, an operation (reading or writing the target data) corresponding to an operation instruction. The access component B receives the first packet sent by the access component A.

In the communications system, because access components of different communications devices communicate with each other through an agreed communications protocol, when sending a request message including the third address and the fourth address to the access component B, the access component A needs to encapsulate the request message into the first packet according to the communications protocol. After receiving the first packet, the access component B also needs to decapsulate the first packet according to the communications protocol, to obtain the request message.

In an implementation, when the access component A communicates with the access component B through an Ethernet protocol, before sending the request message, the access component A needs to add an Ethernet frame header to the request message, and encapsulate the request message into an Ethernet packet. A format of the Ethernet frame header is shown in Table 3.

TABLE 3

| Destination MAC address | Source MAC address | Frame Type | Reserved field |
|---|---|---|---|

The destination MAC address is a MAC address of the communications device B, and the source MAC address is a MAC address of the communications device A.

S206: The access component B determines the SSD B_1 indicated by the third address.

Because the third address includes the indication information of the SSD B_1, the access component B may determine the SSD B_1 based on the indication information of the SSD B_1 in the third address.

It should be further noted that after determining the SSD B_1, the access component B may generate a correspondence including the identifier of the communications device A, the identifier of the SSD B_1, and the third address. In this way, after obtaining a data execution message or a response message transmitted by the SSD B_1, the access component may determine, based on the identifier of the SSD B_1 and the third address in the data execution message or the response message, that a transmission object of these messages is the communications device A.

The identifier of the communications device A may be information that uniquely identifies the communications device A, such as the MAC address of the communications device A.

S207: The access component B transmits the request message to the SSD B_1, so that the SSD B_1 reads or writes the target data based on the third address and the fourth address. The SSD B_1 obtains the request message transmitted by the access component B.

An access component of each communications device in the communications system is connected to the SSD through a peripheral interface. Therefore, when performing the S207, the access component may transmit the request message to the SSD B_1 through the peripheral interface and in a transmission manner corresponding to the peripheral interface. The transmission manner of the request message may include but is not limited to the following manners.

Manner 1: The access component B sends the request message to the SSD B_1.

Manner 2: When a PCIe interface is used between the access component B and the SSD B_1, the request message is transmitted in the following steps.

The access component B stores the request message in the memory of the access component B, and may specifically store the request message by using a queue (for ease of differentiation, the queue may be subsequently referred to as a second command queue), and notifies the SSD B_1 to read the operation instruction.

After obtaining the notification of reading the request message from the access component B, the SSD B_1 reads the operation instruction from the second command queue.

When the PCIe interface of the communications device B is combined with the NVMe, the second command queue may be an SQ stored in the memory of the access component B.

In the manner 2, the access component B may notify, in the following steps, the SSD B_1 to read the operation instruction. The access component B updates a write pointer position of the second command queue after storing the request message in the second command queue, and sends the updated write pointer position of the second command queue to the SSD B_1.

After receiving the updated write pointer position of the second command queue from the access component B, the SSD B_1 may read the operation instruction from the second command queue based on the updated write pointer position of the second command queue.

After the S207, the SSD B_1 obtains the request message, and then the SSD B_1 performs the operation corresponding to the request message. Because the request message may be a read request message or a write request message, the SSD B_1 performs different operations based on a type of the request message.

When the request message is the write request message, the communications device A and the communications device B implement a write operation in S208a to S215a. When the request message is the read request message, the communications device A and the communications device B implement a read operation in S208b to S215b.

A data read request and a data read response in the S208a to the S215a are data execution messages generated during implementation of the write operation. A data storage request and a data storage response in the S208b to the S215b are data execution messages generated during implementation of the read operation.

S208a: The SSD B_1 sends the data read request to the access component B, to request to read the target data stored in the memory of the processor. The data read request includes the third address and the fourth address.

S209a: The access component B determines, based on the correspondence among the identifier of the communications device A, the identifier of the SSD B_1, and the third address, that a transmission object of the data read request is the communications device A, and the access component B sends a second packet to the access component A.

The second packet is obtained by the access component B by encapsulating the data read request according to the communications protocol, and the second packet also includes the third address and the fourth address.

After receiving the second packet sent by the access component B, the access component A decapsulates the second packet to obtain the data read request.

S210a: The access component A performs address conversion on the data read request: converts the third address in the data read request into the second address based on the first mapping table, and determines the first address based on the fourth address.

Then, the access component A reads, in steps S211a and S212a, target data stored in a storage position indicated by the second address.

S211a: The access component A sends the data storage request to the processor A. In this way, the processor A may read the target data based on the second address.

S212a: The processor A sends the data read response to the access component A, where the data read response includes the target data, the first address, and the second address.

S213a: The access component A performs address conversion on the data read response: converts the second address in the data read request into the third address according to the first mapping table, and determines a fourth address based on the first address. For specific descriptions, refer to the descriptions in the S203 to S204. Details are not described herein again.

S214a: The access component A sends a third packet to the access component B. The third packet is obtained by the access component A by encapsulating the data read response according to the communications protocol, and the third packet includes the target data, the third address, and the fourth address.

After receiving the third packet, the access component B determines the SSD B_1 indicated by the third address, and stores, in S215a, the target data at a storage position indicated by the fourth address in the SSD B_1.

S215a: The access component B sends the data read response to the SSD B_1.

After receiving the data read response, the SSD B_1 stores the target data in the data read response into the storage position indicated by the fourth address.

By performing the S208a to S215a, the SSD B_1 may accurately write to-be-written target data into the SSD B_1.

S208b: The SSD B_1 sends the data storage request to the access component B, to request to store the target data in the memory of the processor. The data storage request includes the target data, the third address, and the fourth address.

After receiving the read request message, the SSD B_1 reads the target data from the storage position indicated by the fourth address.

S209b: The access component B determines, based on the correspondence among the identifier of the communications device A, the identifier of the SSD B_1, and the third address, that a transmission object of the data storage request is the communications device A, and the access component B sends a fourth packet to the access component A.

The fourth packet is obtained by the access component B by encapsulating the data read request according to the communications protocol, and the fourth packet also includes the target data, the third address, and the fourth address.

After receiving the fourth packet sent by the access component B, the access component A decapsulates the fourth packet to obtain the data storage request.

S210b: The access component A performs address conversion on the data storage request: converts the third address in the data storage request into the second address based on the first mapping table, and determines the first address based on the fourth address.

Then, the access component A stores, in step S211b, the target data in the storage position indicated by the second address.

S211b: The access component A sends the data storage request to the processor A. In this way, the processor A may store the target data at the storage position indicated by the second address.

S212b: The processor A sends a data storage response to the access component A, where the data storage response is used to notify that the target data is successfully stored in the memory of the processor A. The data storage response includes the first address and the second address.

S213b: The access component A performs address conversion on the data storage response: converts the second address in the data read request into the third address according to the first mapping table, and determines a fourth address based on the first address. For specific descriptions, refer to the descriptions in the S203 to S204. Details are not described herein again.

S214b: The access component A sends a fifth packet to the access component B. The fifth packet is obtained by the access component A by encapsulating the data storage response according to the communications protocol, and the fifth packet includes the third address and the fourth address.

After receiving the fifth packet, the access component B determines the SSD B_1 indicated by the third address.

S215b: The access component B sends the data storage response to the SSD B_1.

After receiving the data storage response, the SSD B_1 may determine that the target data is successfully stored in the memory of the processor A.

By performing the S208a to S215a, the SSD B_1 may accurately store to-be-read target data in the memory of the processor A.

It should be noted that in the S208b to S215b and the S208a to S215a, when the data execution message is transmitted between the processor A and the access component A and between the access component B and the SSD, a direct sending manner may be used, and does not need to be transmitted in the queue storage manner.

After performing the write operation or the read operation in the foregoing steps, the SSD B_1 may further send a response message to the processor A on the communications device A in the following steps S216 to S219, to notify the processor A that the read operation or the write operation is completed.

S216: The SSD B_1 transmits a response message to the access component B, to notify the processor A that the target data is successfully read or written. The response message includes the third address and the fourth address.

When the request message is a write request message, the response message is a write response message. When the request message is a read request message, the response message is a read response message.

It should be noted that the SSD B_1 also needs to transmit the response message to the access component B in a transmission manner corresponding to the peripheral interface. The transmission manner of the response message may include but is not limited to the following two manners.

Manner 1: The SSD B_1 sends the response message to the access component B.

Manner 2: When the PCIe interface is used between the SSD B_1 and the access component B, the SSD B_1 may transmit the response message in the following steps.

The SSD B_1 stores the response message in the memory of the access component B, and may specifically store the response message by using a queue (for ease of differentiation, the queue may be subsequently referred to as a first response queue), and notifies the access component B to read the response message.

When the PCIe interface of the communications device B is combined with the NVMe, the first response queue may be a completion queue (CQ) stored in the memory of the access component B.

Optionally, in the manner 2, the SSD B_1 may notify, in the following steps, the access component B to read the response message. After storing the response message in the first response queue, the SSD B_1 initiates an interrupt (for example, an MSI-X interrupt) to the access component B.

The access component B may read the response message from the first response queue based on the interrupt.

S217: The access component B determines, based on the correspondence among the identifier of the communications device A, the identifier of the SSD B_1, and the third address, that a transmission object of the response message is the communications device A, and the access component B sends a sixth packet to the access component A.

The sixth packet is obtained by the access component B by encapsulating the response message according to the communications protocol, and the sixth packet also includes the third address and the fourth address.

After receiving the sixth packet sent by the access component B, the access component A decapsulates the sixth packet to obtain the response message.

S218: The access component A performs address conversion on the response message: converts the third address in the data storage request into the second address based on the first mapping table, and determines the first address based on the fourth address. After the conversion, the response message includes the first address and the second address.

S219: The access component A transmits the response message to the processor A. In this way, the processor A may determine, based on the response message, that the target data is successfully read or written, and the SSD B_1 successfully completes the operation corresponding to the request message.

Similar to the S216, the access component A also needs to transmit the response message to the processor A in the transmission manner corresponding to the peripheral interface. The transmission manner of the response message may include but is not limited to the following two manners.

Manner 1: The access component A sends the response message to the processor A.

Manner 2: When the PCIe interface is used between the access component A and the processor A, the access component A may transmit the response message in the following steps.

The access component A stores the response message in the memory of the processor A, and may specifically store the response message by using a queue (for ease of differentiation, the queue may be subsequently referred to as a second response queue), and the access component A notifies the processor A to read the response message.

When the PCIe interface of the communications device A is combined with the NVMe, the second response queue may be a CQ stored in the memory of the processor A.

Optionally, in the manner 2, the access component A may notify, in the following steps, the processor A to read the response message. After storing the response message in the second response queue, the access component A initiates an interrupt (for example, an MSI-X interrupt) to the processor A.

The processor A may read the response message from the second response queue based on the interrupt.

According to the message transmission method provided in this embodiment of this application, when determining that the message needs to be transmitted to the SSD B_1 on the communications device B, the access component A of the communications device A in the communications system may convert the storage address of the virtual SSD in the message into the storage address of the SSD B_1, and convert the storage address of the memory of the processor in the message into the storage address indicating the SSD B_1. In this way, after receiving the message, the access component B of the communications device B may determine, based on the indicated storage address of the SSD B_1, that the message is transmitted to the SSD B_1. Therefore, the SSD B_1 completes an operation of reading or writing the target data based on that the SSD B_1 is the storage address and indicates the storage address of the SSD B_1. Because the access component B may complete access of the processor A to the SSD B_1 without using the processor B on the communications device B, in this solution, computing resources of the processor B on the communications device B can be saved, and a delay of access of the communications device A to an SSD located on another communications device can also be reduced.

Figure 7A:
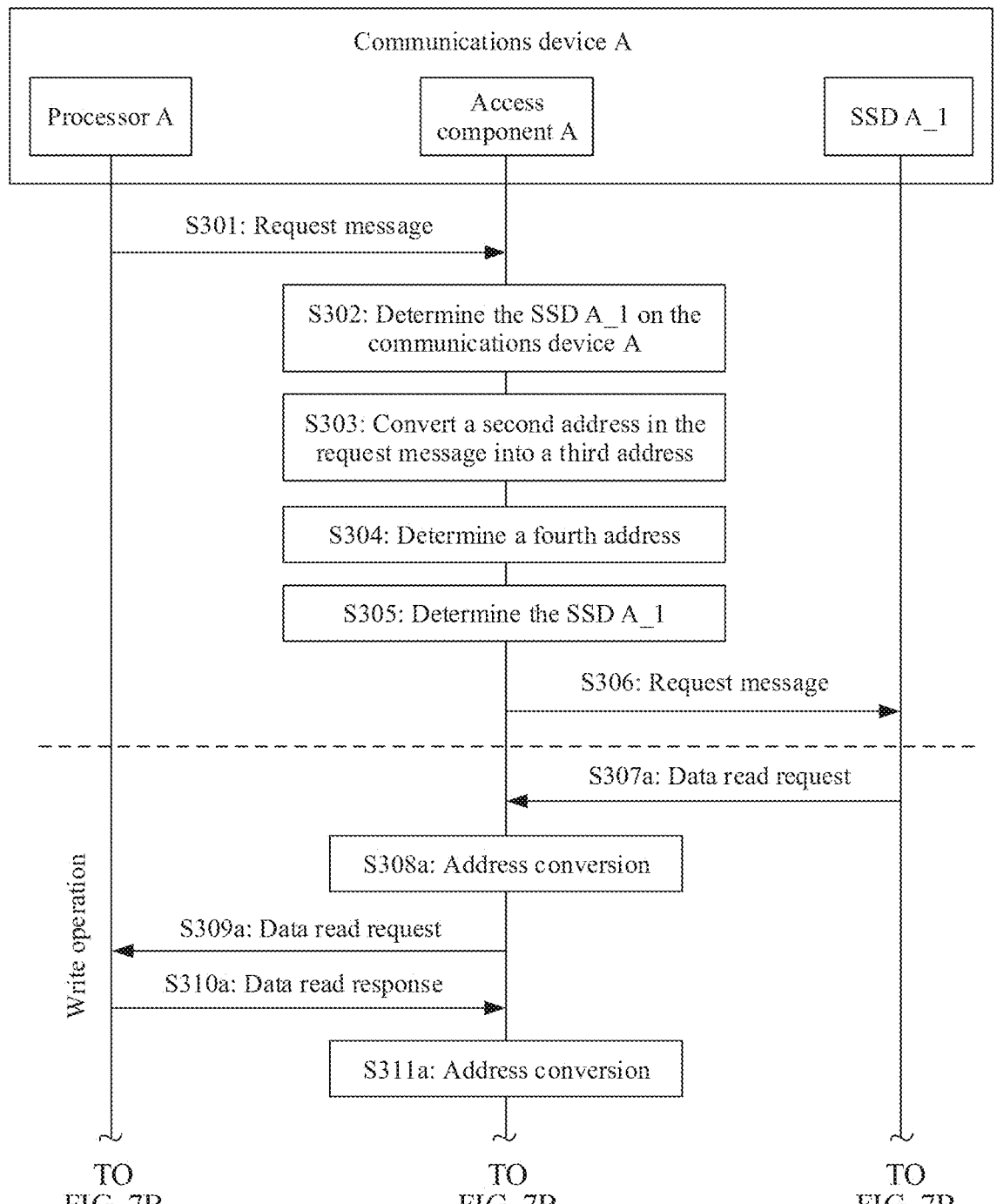
FIG. 7A and FIG. 7B are schematic flowcharts of another message transmission method in a resource pool system an embodiment of according to this application.
Figure 7B:
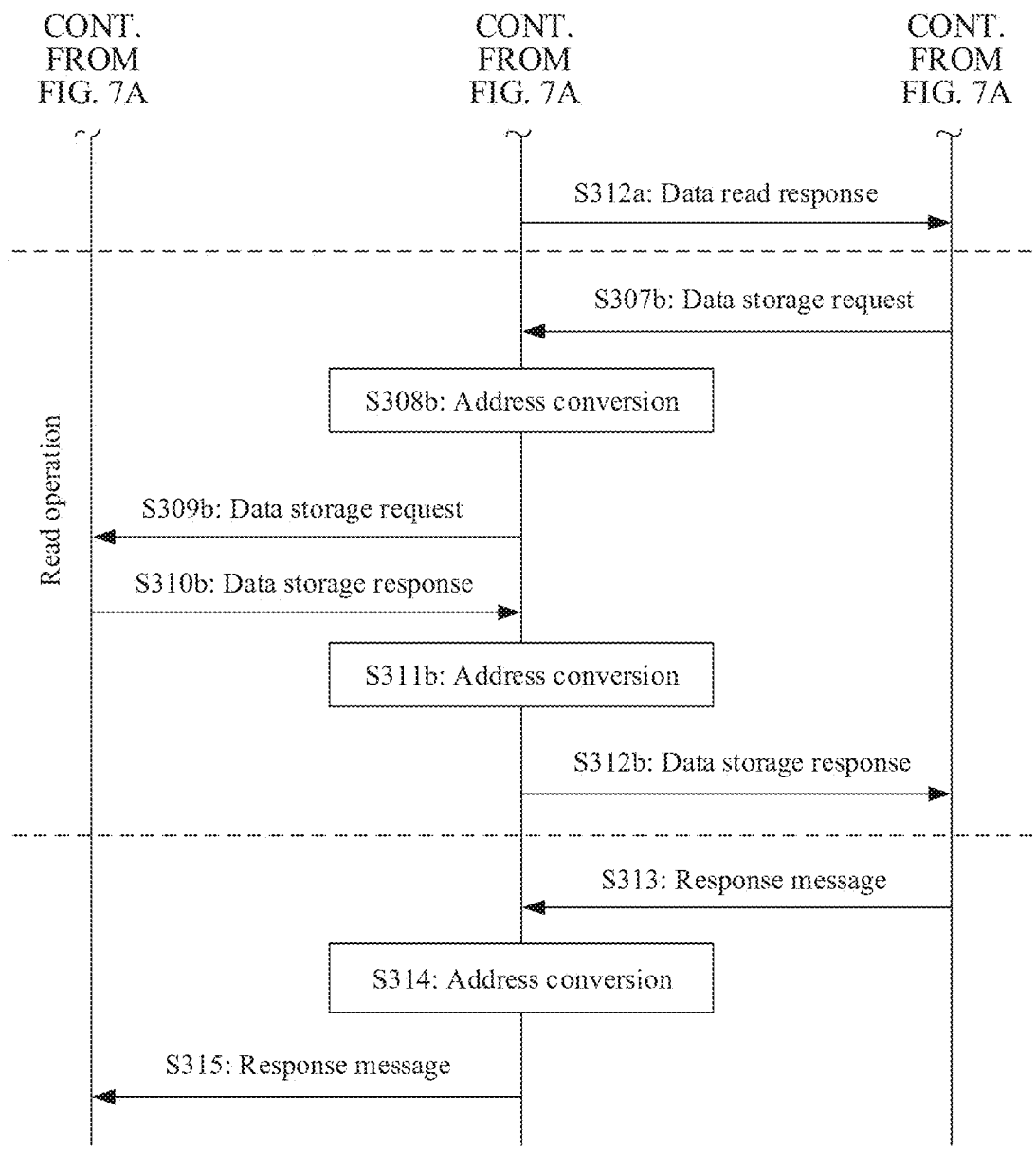

It should be further noted that if the access component A determines that the transmission object of the request message is a local SSD (for example, an SSD A_1) of the communications device A, in other words, the scenario 1 is currently met, the communications device A may transmit the message according to a procedure of the message transmission method shown in FIG. 7A and FIG. 7B. A difference between the procedure of the message transmission method shown in FIG. 6A and FIG. 6B and the procedure of the message transmission method shown in FIG. 7A and FIG. 7B is that in the procedure of the message transmission method shown in FIG. 7A and FIG. 7B, there is no need to transmit each packet between the access component A and the access component B. The steps originally performed by the access component B are now performed by the access component A. The target SSD is changed from the SSD B_1 to the SSD A_1. Therefore, for descriptions of the steps in the procedure, refer to descriptions of corresponding steps in the embodiment shown in FIG. 6A and FIG. 6B. Details are not described herein again.

It is worthwhile to note that, to make the description brief, the foregoing method embodiments are expressed as a series of actions. However, a person skilled in the art should appreciate that this application is not limited to the described action sequence. In addition, a person skilled in the art should also appreciate that all the embodiments described in this specification are embodiments, and the related actions are not necessarily mandatory to this application.

Another appropriate step combination that a person skilled in the art can think of based on the content described above also falls within the protection scope of this application. In addition, a person skilled in the art should also appreciate that all the embodiments described in the specification are exemplary embodiments, and the related actions are not necessarily mandatory to this application.

The foregoing describes in detail the resource pool management method provided in the embodiments of this application with reference to FIG. 1 to FIG. 7A and FIG. 7B. The following describes, with reference to FIG. 8 to FIG. 11, a resource pool management apparatus, a resource pool control unit, and a server that are provided in the embodiments of this application.

Figure 8:
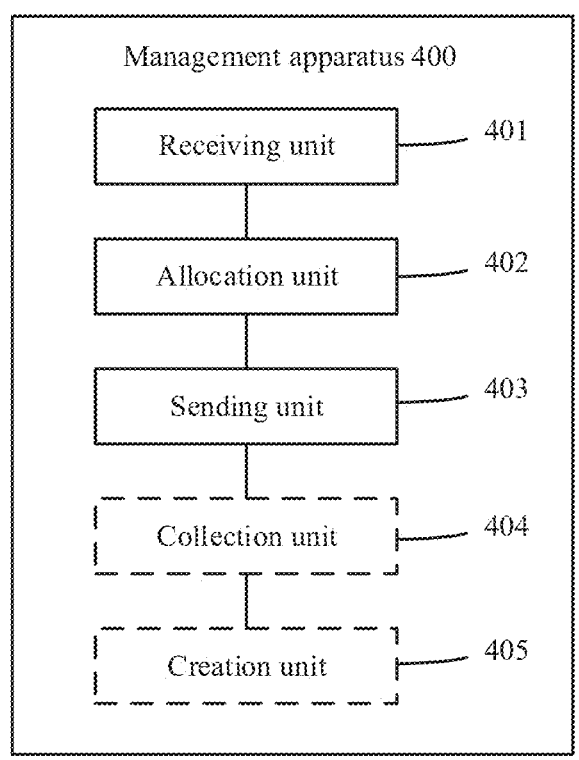
FIG. 8 is a schematic structural diagram of a resource pool management apparatus according to an embodiment of this application.

FIG. 8 is a schematic structural diagram of a resource pool management apparatus 400 according to this application. As shown in the figure, the apparatus 400 includes a receiving unit 401, an allocation unit 402, and a sending unit 403.

The receiving unit 401 is configured to receive a resource application request of an application program on any communications device, where the resource application request includes a type and a resource quantity of a required resource, the management apparatus is a resource pool control unit deployed on any one of a plurality of communications devices on which the resource pool control unit is deployed, the type is used to indicate a type of a hardware resource required by the application program, and the resource quantity is used to indicate a size of the hardware resource required by the application program.

The allocation unit 402 is configured to allocate a first resource from a resource pool based on a preset rule and the resource application request that is received by the receiving unit 401, where the first resource includes one or more logical hardware devices. The resource pool includes idle hardware devices in the plurality of communications devices, the resource pool includes one or more logical devices, and each logical device includes one or more hardware devices.

The sending unit 403 is configured to send a resource configuration request to a second resource pool control unit, so that the second resource pool control unit completes configuration of the first resource based on the resource configuration request generated by the first resource allocated by the allocation unit 402, and provide a hardware resource for the application program, where the second resource pool control unit is a resource pool control unit deployed on the communications device on which the application program is located.

It should be understood that the apparatus 400 in this embodiment of this application may be implemented through an application-specific integrated circuit (ASIC), or may be implemented through a programmable logic device (PLD). The PLD may be a complex programmable logic device (CPLD), a field-programmable gate array (FPGA), generic array logic (GAL), or any combination thereof. Alternatively, when the resource pool management method shown in FIG. 3A and FIG. 3B may be implemented through software, the management apparatus 400 and modules of the management apparatus 400 may be software modules.

The foregoing apparatus may deploy one resource pool control unit on all or some communications devices in the system based on a service requirement, and then select a resource control unit from a plurality of resource pool control units to manage the resource pool. When the request of the application program is received, the resource pool control unit that is responsible for managing the resource pool at a current moment may be allocated, as the first resource that includes one or more logical hardware devices, and the first resource is allocated to the application program for use. A resource pool control unit in deployed resource pool control units is responsible for managing the resource pool at any moment. When the resource pool control unit that manages the resource pool at the current moment is faulty, another resource pool control unit may continue to manage the resource pool, to avoid affecting a system service. On the other hand, a quantity of resource pool control units may be flexibly configured. As long as a resource pool control unit is added to the communications device, the resource pool control unit can participate in resource pool management, and a layout manner is more flexible. During specific implementation, the quantity of resource pool control units may be set based on a service requirement. Compared with a manner in which a management node needs to be deployed through an independent communications device in a conventional technology, costs are lower.

Optionally, the apparatus 400 is determined according to any one of the following rules.

Manner 1: Any resource pool control unit determined based on an identifier of the resource pool control unit.

Manner 2: One resource pool control unit with a lightest load in the plurality of resource pool control units.

Manner 3: The first started resource pool control unit in the system.

The apparatus 400 may randomly select, from the plurality of communications devices on which the resource pool control unit is deployed, a resource pool control unit to manage the resource pool, to eliminate a centralization problem caused by relying on a management node in resource pool management in a conventional technology. In addition, a quantity of deployed resource pool control units may be set based on a service requirement, and configuration is more flexible.

Optionally, the apparatus 400 further includes a collection unit 404 and a creation unit 405.

The collection unit 404 is configured to collect first hardware information that is on a communications device on which the first resource pool control unit is located and that can be used to establish the resource pool, where the first hardware information includes a type, a resource quantity, and a position of a hardware device.

The receiving unit 401 is further configured to receive second hardware information that is sent by a resource pool control unit of each of the plurality of communications devices other than the first resource pool control unit and that can be used to establish the resource pool, where the second hardware information includes the type, the resource quantity, and the position of the hardware device.

The creation unit 405 is configured to create the resource pool based on the first hardware information and the second hardware information, and create one or more logical hardware devices in the resource pool, where each logical hardware device includes one or more hardware devices.

In a process of managing the resource pool, especially in an initialization phase, the apparatus 400 needs to create the resource pool through the hardware device that is on the communications devices and that can be used to establish the resource pool, and allocate the hardware device as one or more logical hardware devices, to refine a resource management granularity and improve resource utilization efficiency.

The creation unit 405 is further configured to create one or more resource pools based on the type of the hardware device, and group one or more hardware devices into a plurality of groups in a same resource pool based on the resource quantity of the hardware device.

Optionally, the creation unit 405 is further used by the first resource pool control unit to use the plurality of hardware devices as one logical hardware device, or used by the first resource pool control unit to allocate one hardware device as a plurality of logical hardware devices, or used by the first resource pool control unit to use one hardware device as one logical hardware device.

In this way, the hardware device is refinedly managed, and different logical devices are allocated to different applications based on different service requirements, to meet different resource requirements and improve usage of the hardware device in the resource pool.

Optionally, the allocation unit 402 is further configured to preferentially allocate a logical hardware device that includes a hardware device of a communications device closest to the communications device on which the second resource pool control unit is located, as the first resource, where the communications device closest to the communications device on which the second resource pool control unit is located is a communications device that has a shortest data transmission distance from the second resource pool control unit. This reduces a delay for the application program to access a hardware resource, shortens a data processing duration, and improves data processing efficiency.

Optionally, the allocation unit 402 is further configured to: pre-establish a binding relationship between the second resource pool control unit and another resource pool control unit in the resource pool, and when the application program needs to request a resource, preferentially allocate a logical hardware device that includes a hardware device of a communications device on which a resource pool control unit having the binding relationship with the second resource pool control unit is located, as the first resource.

In a specific embodiment, to meet a service requirement of a special or important application program, the binding relationship of the resource pool control unit may be pre-established based on hardware configuration or a position and a processing capability of the logical hardware device, to ensure the requirement of the special or important application for the hardware device, and improve the processing capability of the hardware device.

The apparatus 400 according to this embodiment of this application may correspondingly perform the method described in the embodiments of this application. In addition, the foregoing and other operations and/or functions of the units in the apparatus 400 are separately used to implement a corresponding procedure of the method in FIG. 3A and FIG. 3B. For brevity, details are not described herein again.

Figure 9:
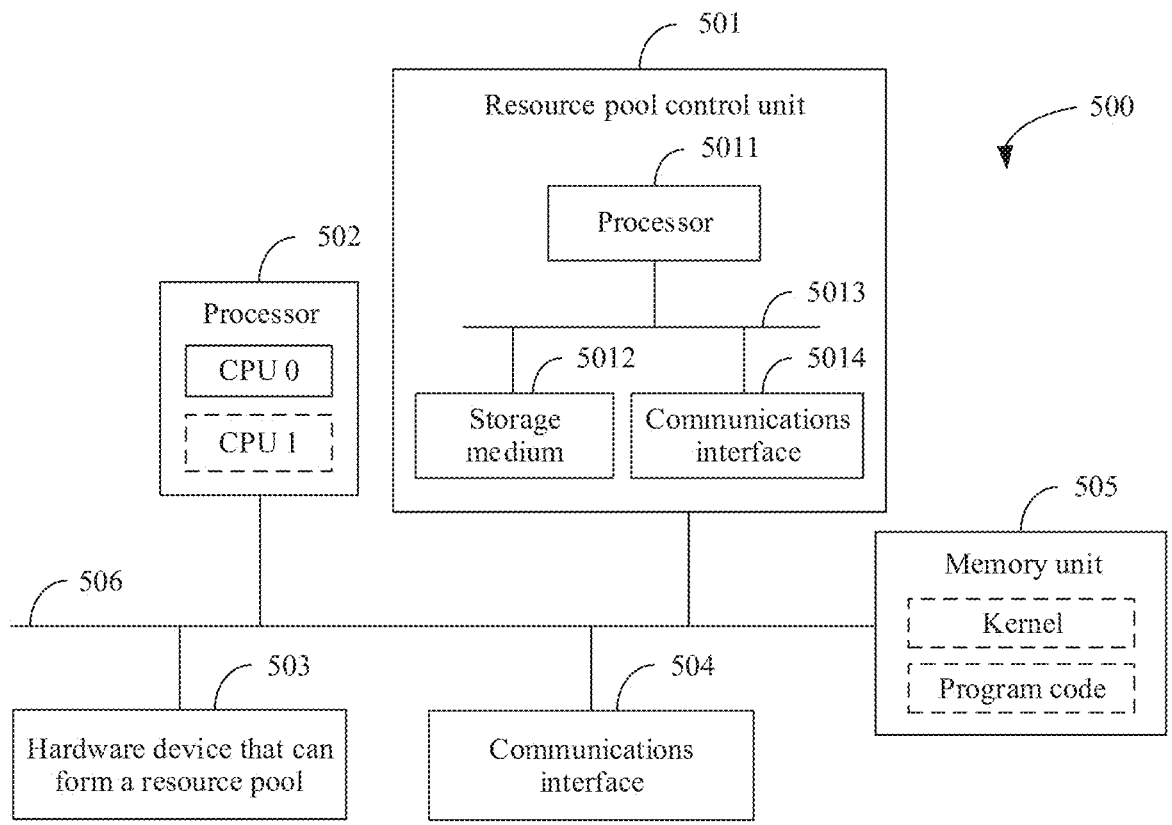
FIG. 9 is a schematic structural diagram of a server according to an embodiment of this application.

FIG. 9 is a schematic diagram of a communications device 500 according to an embodiment of this application. As shown in the figure, the communications device 500 includes a resource pool control unit 501, a processor 502, a hardware device 503 that can form a resource pool, a communications interface 504, a memory unit 505, and a bus 506. The resource pool control unit 501, the processor 502, the hardware device 503 that can form the resource pool, the communications interface 504, and the memory unit 505 are interconnected through the bus 506. The memory unit 505 may be a random access memory (RAM). The memory unit 505 may be physically integrated into the processor 502, or may be constructed in an independent unit or a unit.

The resource pool control unit 501 includes a processor 5011, a storage medium 5012, and a bus 5013. The processor 5011 and the storage medium 5012 also communicate with each other through the bus 5013. Optionally, the resource pool control unit 501 further includes a communications interface 5014, configured to communicate with another component of the communications device 500 through the bus 506. The resource pool control unit 501 may be connected to the communications device 500 through a PCIe slot, or may be inherited on a printed circuit board (PCB) of the communications device in a welding manner. In the foregoing manner, the communications interface 5014 is a PCIe interface. When the resource pool control unit 501 runs, the processor 5011 of the resource pool control unit 501 may execute program code stored in the storage medium 5012, to implement the resource pool management method shown in FIG. 3A and FIG. 3B.

The hardware device 503 that can form the resource pool is a hardware device that is on the communications device and that is allowed to form the resource pool, and includes but is not limited to a CPU, an AI chip, a GPU, a disk, a network interface card, and the like shown in FIG. 2A and FIG. 2B.

Optionally, the processor 502 or the processor 5011 includes one or more central processing units (CPUs). The processor 502 shown in FIG. 9 includes a CPU 0 and a CPU 1. The processor 502 or the processor 5011 may be a single-core (single-CPU) processor, or may be a multi-core (multi-CPU) processor, unless otherwise specified, otherwise, components such as a processor or a memory configured to perform a task may be implemented as a temporarily configured general component configured to perform the task at a given time or a specific component manufactured to perform the task. For example, the term "processor" used herein refers to one or more devices or circuits. Alternatively, the processor 502 or the processor 5011 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or any conventional processor or the like.

Optionally, the application program shown in FIG. 2A and FIG. 2B runs in the processor 502. When the application program needs to apply for a resource, a resource pool control unit that manages a resource pool at a current moment applies for the resource, and after completing configuration of the first resource, the resource pool control unit 501 may provide a hardware resource for the application program.

The communications interface 504 is configured to perform communication between the communications device 500 and another communications device. In addition, deploying communication between resource pool control units means that the resource pool control unit 501 transfers a message to the communications interface 504 through the communications interface 5014 of the resource pool control unit 501 through the bus 506, and then transmits the message to another communications device through the communications interface 504. Similar to the foregoing process, a process in which the communications device 500 receives another communications device also needs transmission to the resource pool control unit 501 through the communications interface 504.

The memory unit 505 is configured to store a kernel and other program code, including program code for running an application program. In addition to a data bus, the bus 506 and bus 5013 may further include a power bus, a control bus, a status signal bus, and the like. However, for clarity of description, various buses are marked as the bus 506 and the bus 5013 in the figure.

It should be understood that the communications device 500 according to this embodiment of this application may be corresponding to the management apparatus 400 in the embodiments of this application, and may correspond to a corresponding body for performing the method shown in FIG. 3A and FIG. 3B according to the embodiments of this application. In addition, the foregoing and other operations and/or functions of the modules on the communications device 500 are separately used to implement corresponding procedures of the methods in FIG. 3A and FIG. 3B. For brevity, details are not described herein again.

An embodiment of this application further provides a resource pool control unit. A hardware architecture of the resource pool control unit is shown in the resource pool control unit in FIG. 9, and is used to implement operation steps of the method performed by the hard resource pool control unit in the method shown in FIG. 3A and FIG. 3B. For brevity, details are not described herein again.

In the foregoing technical solution, the resource pool control unit is deployed on all or some communications devices in the system based on a service requirement, and then a resource control unit is selected from a plurality of resource pool control units to manage the resource pool. When the request of the application program is received, the resource pool control unit that is responsible for managing the resource pool at the current moment may be allocated as the first resource that includes one or more logical hardware devices, and the first resource is allocated to the application program for use. A resource pool control unit in deployed resource pool control units is responsible for managing the resource pool at any moment. When the resource pool control unit that manages the resource pool at the current moment is faulty, another resource pool control unit may continue to manage the resource pool, to avoid affecting a system service. On the other hand, a quantity of resource pool control units may be flexibly configured. As long as a resource pool control unit is added to the communications device, the resource pool control unit may participate in resource pool management, and a layout manner is more flexible. During specific implementation, the quantity of resource pool control units may be set based on a service requirement. Compared with a manner in which a management node needs to be deployed through an independent communications device in a conventional technology, costs are lower.

Figure 10:
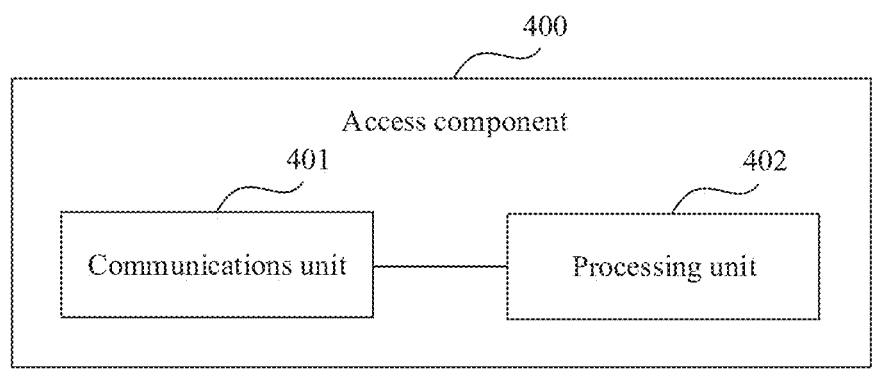
FIG. 10 is a schematic structural diagram of an access component according to an embodiment of this application.

FIG. 10 is a schematic structural diagram of an access component 400 according to an embodiment of this application. The access component 400 is applied to a communications device, and is configured to implement the message transmission method shown in FIG. 6A and FIG. 6B or FIG. 7A and FIG. 7B, and has a function of an access component A of a communications device A or a function of an access component B of a communications device B. As shown in the figure, the access component 400 includes a communications unit 401 and a processing unit 402.

In an implementation, the access component 400 has a function of the access component A of the communications device A.

The communications unit 401 is configured to obtain a message transmitted by a processor A of the communications device A, where the message includes a first address and a second address, the first address is used to indicate a storage position of target data on the virtual hardware device, the second address is used to indicate a storage position of the target data in the memory of the processor, and the virtual hardware device includes at least one hardware device.

The processing unit 402 is configured to: when the processing unit determines that the storage position indicated by the first address belongs to a target hardware device of the second communications device B, convert the second address in the message into a third address. A first mapping table is used to record a mapping relationship between the second address and indication information of the target hardware device, determine a fourth address based on the first address, where the fourth address is used to indicate a storage position of the target data on the target hardware device.

The communications unit 401 is further configured to send a first packet to the access component B of the communications device B, where the first packet includes the third address and the fourth address, so that the access component B reads or writes the target data based on the third address and the fourth address.

In an implementation, the access component 400 has a function of the access component B of the communications device B.

The communications unit 401 is configured to receive a first packet sent by the access component A of the communications device A, where the first packet includes a third address and a fourth address, the third address is used to indicate a target hardware device that belongs to the second communications device, and the fourth address is used to indicate a storage position of target data in the target hardware device.

The processing unit 402 is configured to determine the target hardware device indicated by the third address.

The communications unit 402 is further configured to transmit a first message including the third address and the fourth address to the target hardware device, so that the target hardware device reads or writes the target data based on the third address and the fourth address.

Optionally, the access component 400 has a function of the access component A and a function of the access component B.

Optionally, the communications unit 401 may include a communications port and a communications interface. The communications port is configured to implement communication between the access component 400 and another component of a communications device on which the access component 400 is located. The communications interface is configured to implement communication between the access component 400 and an access component of another communications device.

It should be understood that the communications device on which the access component 400 is located in this embodiment of this application may correspond to any communications device in the communications system shown in any one of FIG. 1, FIG. 2A and FIG. 2B, or FIG. 4. The access component 400 in this embodiment of this application may be implemented through an application-specific integrated circuit or a programmable logic device. The PLD may be a complex program logic device, a field programmable gate array, general-purpose array logic, a system on chip, or any combination thereof. In addition, the access component 400 may also implement, through software, the method shown in FIG. 6A and FIG. 6B or FIG. 7A and FIG. 7B. In this case, the access component 400 and units of the access component 400 may also be software modules.

The access component 400 according to this embodiment of this application may correspondingly perform the method described in the embodiments of this application. In addition, the foregoing and other operations and/or functions of the units in the access component 400 are separately used to implement a corresponding procedure of the method in FIG. 6A and FIG. 6B or FIG. 7A and FIG. 7B. For brevity, details are not described herein again.

An embodiment of this application provides an access component. When a communications device on which the access component is located is an application device, when the access component determines that a message needs to be transmitted to a target hardware device on another resource device, a storage address of a virtual hardware device in the message may be converted into a storage address of a target hardware device, and a storage address of a memory of a processor in the message may be converted into a storage address indicating the target hardware device. In this way, after receiving the message, the access component of the resource device may not perform an operation through the processor of the resource device, but directly transmit the message to the target hardware device based on the storage address indicating the target hardware device. Therefore, the target hardware device may complete an operation of reading or writing the target data based on the storage address of the target hardware device and the indicated storage address of the hardware device. Apparently, the access component may save computing resources of the processor of the resource device, and may also reduce an access delay of the application device for a hardware device located on another communications device.

When the communications device on which the access component is located is a resource device, after receiving a message transmitted by another access component, the access component directly determines, based on the storage address indicating the target hardware device, that the message is transmitted to the target hardware device. Therefore, the target hardware device may complete an operation of reading or writing the target data based on the storage address of the target hardware device and the storage address indicating the hardware device. Apparently, the access component may save computing resources of the processor of the resource device, and may also reduce an access delay of the application device for a hardware device located on another communications device.

Figure 11:
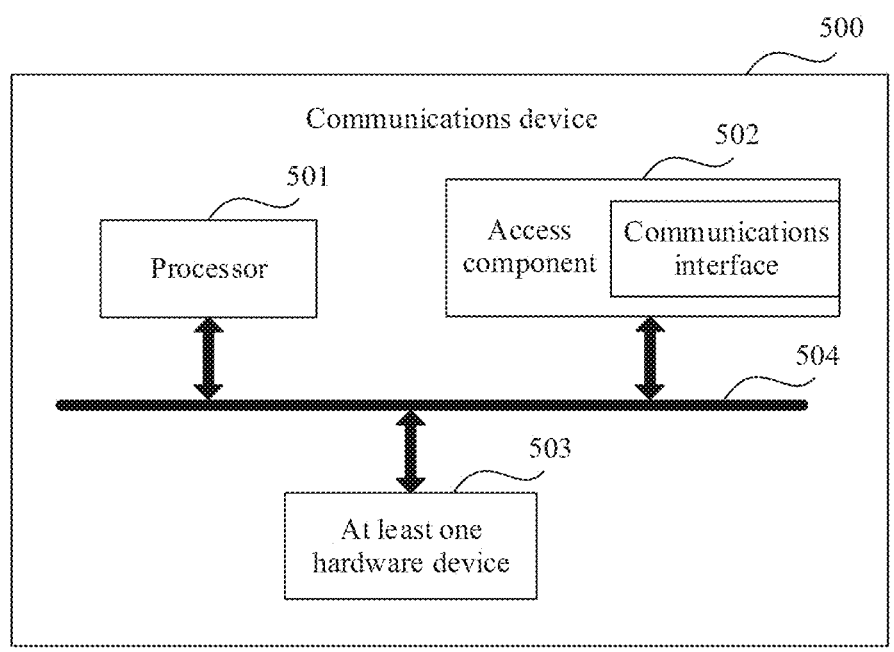
FIG. 11 is a schematic structural diagram of a communications device according to an embodiment of this application.

This application further provides a communications device. The communications device may correspond to any communications device in the communications system shown in any system architecture in FIG. 1, FIG. 2A and FIG. 2B, and FIG. 4. Referring to FIG. 11, the communications device 500 includes a processor 501, an access component 502, and at least one hardware device 503, and a bus 504. The processor 501, the access component 502, and the at least one hardware device 503 are connected through the bus 504. The access component 502 is configured to implement the message transmission method shown in FIG. 6A and FIG. 6B or FIG. 7A and FIG. 7B, and has a function of an access component A of a communications device A and/or a function of an access component B of a communications device B. The access component 502 includes a communications interface, configured to implement communication with another communications device.

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In a plurality of embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of this application. Any variation or replacement readily figured out by a person skilled in the art based on the specific implementations provided in this application shall fall within the protection scope of this application.

What is claimed is:

1. A method comprising:
receiving, by a first resource pool control unit of a first communications device of a plurality of communications devices in a resource pool management system from a second communications device of the plurality of communications devices in the resource pool management system, a resource application request of an application program on the second communications device, wherein each of the plurality of communications devices has a resource pool control unit deployed, the resource application request comprises a type and a resource quantity of a first resource requested by the application program, the type indicates a type of a hardware resource requested by the application program, and the resource quantity indicates a size of the hardware resource;
allocating, by the first resource pool control unit according to a preset rule and the resource application request, the first resource from a resource pool of the resource pool management system, wherein the first resource comprises one or more logical hardware devices in the resource pool, a logical hardware device in the resource pool comprises a resource of an idle hardware device in the plurality of communications devices, and each logical hardware device corresponds to one or more hardware devices in the plurality of communications devices; and
sending, by the first resource pool control unit, a resource configuration request to a second resource pool control unit of the second communications device, to instruct the second resource pool control unit to complete configuration of the first resource based on the resource configuration request, and to provide the first resource for the application program.

2. The method according to claim 1, wherein the first resource pool control unit is determined from a plurality of resource pool control units deployed on the plurality of communications devices according to any one of following rules:
the first resource pool control unit is any resource pool control unit determined based on an identifier of the first resource pool control unit;
the first resource pool control unit is a resource pool control unit with a lightest load in the plurality of resource pool control units; or
the first resource pool control unit is a first started resource pool control unit in the resource pool management system.

3. The method according to claim 1, wherein before receiving the resource application request of the application program on the second communications device, the method further comprises:
collecting, by the first resource pool control unit, first hardware information that is of the first communications device and that is usable to establish the resource pool, wherein the first hardware information comprises a type, a resource quantity, and a position of a first hardware device of the first communications device;
receiving, by the first resource pool control unit, second hardware information that is sent by a resource pool control unit deployed on each of the plurality of communications devices other than the first communications device and that is usable to establish the resource pool, wherein the second hardware information comprises a type, a resource quantity, and a position of a second hardware device of a corresponding communications device;

creating, by the first resource pool control unit, the resource pool based on the first hardware information and the second hardware information; and creating, by the first resource pool control unit, at least one logical hardware device in the resource pool.

4. The method according to claim 3, wherein creating, by the first resource pool control unit, the resource pool based on the first hardware information and the second hardware information comprises:

creating one or more resource pools based on types of hardware devices of the plurality of communications devices; and grouping one or more hardware devices in a same resource pool into a plurality of groups based on resource quantities of the one or more hardware devices in the same resource pool.

5. The method according to claim 4, wherein creating, by the first resource pool control unit, the at least one logical hardware device in the resource pool comprises any one or more of following:

logically allocating a plurality of hardware devices as one logical hardware device;

logically allocating one hardware device as a plurality of logical hardware devices; or logically allocating one hardware device as one logical hardware device.

6. The method according to claim 1, wherein allocating the first resource from the resource pool comprises:

allocating a logical hardware device in the resource pool for the application program, with the logical hardware device comprising a resource of a hardware device of a communications device that is closest to the second communications device among the plurality of communications devices, wherein the communications device has a shortest data transmission distance from the second resource pool control unit.

7. The method according to claim 1, wherein allocating, by the first resource pool control unit, the first resource from the resource pool comprises:

pre-establishing a binding relationship between the second resource pool control unit of the second communications device and a third resource pool control unit of a third communications device in the plurality of communications devices; and allocating, by the first resource pool control unit, a logical hardware device that comprises a resource of a hardware device of the third communications device, as the first resource.

8. A first resource pool control unit of a first communications device of a plurality of communications devices in a resource pool management system, wherein the first resource pool control unit comprises a processor and a memory, the memory is configured to store a computer-executable instruction, and when the first resource pool control unit runs, the processor executes the computer-executable instruction in the memory, to cause the first resource pool control unit to perform following steps:

receiving, from a second communications device of the plurality of communications devices in the resource pool management system, a resource application request of an application program on the second communications device, wherein each of the plurality of communications devices has a resource pool control unit deployed, the resource application request comprises a type and a resource quantity of a first resource requested by the application program, the type indicates a type of a hardware resource requested by the application program, and the resource quantity indicates a size of the hardware resource;

allocating, according to a preset rule and the resource application request, the first resource from a resource pool of the resource pool management system, wherein the first resource comprises one or more logical hardware devices in the resource pool, a logical hardware device in the resource pool comprises a resource of an idle hardware device in the plurality of communications devices, and each logical hardware device corresponds to one or more hardware devices in the plurality of communications devices; and send a resource configuration request to a second resource pool control unit of the second communications device, to instruct the second resource pool control unit to complete configuration of the first resource based on the resource configuration request, and to provide the first resource for the application program.

9. The first resource pool control unit of claim 8, wherein the first resource pool control unit is determined from a plurality of resource pool control units deployed on the plurality of communications devices according to any one of following rules:

the first resource pool control unit is any resource pool control unit determined based on an identifier of the first resource pool control unit;

the first resource pool control unit is a resource pool control unit with a lightest load in the plurality of resource pool control units; or the first resource pool control unit is a first started resource pool control unit in the resource pool management system.

10. The resource pool control unit of claim 8, wherein the processor executes the computer-executable instruction in the memory, to perform:

collecting first hardware information of the first communications device that is usable to establish the resource pool, wherein the first hardware information comprises a type, a resource quantity, and a position of a first hardware device of the first communications device;

receiving second hardware information that is sent by a resource pool control unit deployed on each of the plurality of communications devices other than the first communications device and that is usable to establish the resource pool, wherein the second hardware information comprises a type, a resource quantity, and a position of a second hardware device of a corresponding communications device;

creating the resource pool based on the first hardware information and the second hardware information; and creating at least one logical hardware device in the resource pool.

11. The resource pool control unit of claim 10, wherein the processor executes the computer-executable instruction in the memory, to perform:

creating one or more resource pools based on types of hardware devices of the plurality of communications devices; and grouping one or more hardware devices in a same resource pool into a plurality of groups based on resource quantities of the one or more hardware devices.

12. The resource pool control unit of claim 10, wherein the processor executes the computer-executable instruction in the memory, to perform:

logically allocating a plurality of hardware devices as one logical hardware device;

logically allocating one hardware device as a plurality of logical hardware devices; or logically allocating one hardware device as one logical hardware device.

13. The resource pool control unit of claim 10, wherein the processor executes the computer-executable instruction in the memory, to perform:

allocating a logical hardware device in the resource pool for the application program, with the logical hardware device comprising a resource of a hardware device of a communications device that is closest to the second communications device among the plurality of communications devices, wherein the communications device has a shortest data transmission distance from the second resource pool control unit.

14. The resource pool control unit of claim 10, wherein the processor executes the computer-executable instruction in the memory, to perform:

pre-establishing a binding relationship between the second resource pool control unit and a third resource pool control unit of a third communications device in the plurality of communications devices; and allocating a logical hardware device that comprises a resource of a hardware device of the third communications device, as the first resource.

15. A non-transitory computer-readable storage medium comprising instructions that, when executed by a computer, cause a first resource pool control unit of a first communications device of a plurality of communications devices in a resource pool management system to perform:

receiving, from a second communications device of the plurality of communications devices in the resource pool management system, a resource application request of an application program on the second communications device, wherein each of the plurality of communications devices has a resource pool control unit deployed, the resource application request comprises a type and a resource quantity of a first resource, the type indicates a type of a hardware resource requested by the application program, and the resource quantity indicates a size of the hardware resource;

allocating, according to a preset rule and the resource application request, the first resource from a resource pool of the resource pool management system, wherein the first resource comprises one or more logical hardware devices in the resource pool, a logical hardware device in the resource pool comprises a resource of an idle hardware device in the plurality of communications devices, and each logical hardware device corresponds to one or more hardware devices in the plurality of communications devices; and sending a resource configuration request to a second resource pool control unit of the second communications device, to instruct the second resource pool control unit to complete configuration of the first resource based on the resource configuration request, and to provide the first resource for the application program.

16. The non-transitory computer-readable storage medium of claim 15, wherein the first resource pool control unit is determined from a plurality of resource pool control units deployed on the plurality of communications devices according to any one of following rules:

the first resource pool control unit is any resource pool control unit determined based on an identifier of the first resource pool control unit;

the first resource pool control unit is a resource pool control unit with a lightest load in the plurality of resource pool control units; or the first resource pool control unit is a first started resource pool control unit in the resource pool management system.

17. The non-transitory computer-readable storage medium of claim 15, further comprising instructions that, when executed by the computer, cause the first resource pool control unit to perform:

collecting first hardware information of the first communications device that is usable to establish the resource pool, wherein the first hardware information comprises a type, a resource quantity, and a position of a first hardware device of the first communications device;

receiving second hardware information that is sent by a resource pool control unit deployed on each of the plurality of communications devices other than the first communications device and that is usable to establish the resource pool, wherein the second hardware information comprises a type, a resource quantity, and a position of a second hardware device of a corresponding communications device;

creating the resource pool based on the first hardware information and the second hardware information; and creating at least one logical hardware device in the resource pool.

18. The non-transitory computer-readable storage medium of claim 15, further comprising instructions that, when executed by the computer, cause the first resource pool control unit to perform:

creating one or more resource pools based on types of hardware devices of the plurality of communications devices; and grouping one or more hardware devices in a same resource pool into a plurality of groups based on resource quantities of the one or more hardware devices.

19. The non-transitory computer-readable storage medium of claim 15, further comprising instructions that, when executed by the computer, cause the first resource pool control unit to perform:

logically allocating a plurality of hardware devices as one logical hardware device;

logically allocating one hardware device as a plurality of logical hardware devices; or logically allocating one hardware device as one logical hardware device.

20. The non-transitory computer-readable storage medium of claim 15, further comprising instructions that, when executed by the computer, cause the first resource pool control unit to perform:

allocating a logical hardware device in the resource pool for the application program, with the logical hardware device comprising a resource of a hardware device of a communications device that closest to the second communications device among the plurality of communications devices, wherein the communications device has a shortest data transmission distance from the second resource pool control unit.

* * * * *